United States Patent
Visvardis et al.

(10) Patent No.: US 12,530,517 B1
(45) Date of Patent: Jan. 20, 2026

(54) RANDOM-WALK BASED CAPACITANCE EXTRACTION WITH OPTIMIZED TRANSITION VOLUMES

(71) Applicant: ANSYS, INC., Canonsburg, PA (US)

(72) Inventors: Marios Visvardis, Athens (GR); Periklis Liaskovitis, Agia Paraskevi (GR); Efthymios Efstathiou, Athens (GR); Dimitrios Skrepetos, Alimos (GR)

(73) Assignee: ANSYS, INC., Canonsburg, PA (US)

( * ) Notice: Subject to any disclaimer, the term of this patent is extended or adjusted under 35 U.S.C. 154(b) by 686 days.

(21) Appl. No.: 17/944,133

(22) Filed: Sep. 13, 2022

(51) Int. Cl.
  *G06F 30/392* (2020.01)
  *G06F 30/23* (2020.01)
  *G06F 119/06* (2020.01)

(52) U.S. Cl.
  CPC ............ *G06F 30/392* (2020.01); *G06F 30/23* (2020.01); *G06F 2119/06* (2020.01)

(58) Field of Classification Search
  USPC ........................................................ 716/100
  See application file for complete search history.

(56) References Cited

U.S. PATENT DOCUMENTS

2010/0122222 A1* 5/2010 Elfadel ................. G06F 30/367
  716/136

* cited by examiner

*Primary Examiner* — Bryce M Aisaka
(74) *Attorney, Agent, or Firm* — WOMBLE BOND DICKINSON (US) LLP

(57) ABSTRACT

A CAD method for capacitance extraction includes decomposing a semiconductor structure model representing a three-dimensional, into virtual layers. Each virtual layer has polygons corresponding to conductors in the semiconductor structure model. The semiconductor structure model or includes a geometric point. The method includes creating spatial indexes respectively for the virtual layers. Each spatial index indicates respectively for each spatial index cell of a corresponding virtual layer at least one candidate conductor of the corresponding virtual layer. The method includes creating optimal transition squares for the geometric point respectively for one or more consecutive virtual layers according to spatial indexes of the one or more consecutive virtual layers. The geometric point is located in one of the one or more consecutive virtual layers. The optimal transition squares are constrained by one or more candidate conductors of the one or more consecutive virtual layers. The method includes creating an optimal transition cube for the geometric point considering the one or more candidate conductors based on the optimal transition squares. The method includes calculating capacitance of the three-dimensional circuit using surfaces of the optimal transition cube.

20 Claims, 20 Drawing Sheets

2202 — Decompose 3D semiconductor model into 2D layers

2204 — Create spatial index for each 2D layer

2206 — Create optimal transiton cube for spatial index cell of spatial index, across spatial indexes and 2D layers 2208 — Calculate capacitance between conductors using random walk process according to optimal transition cubes

Algorithm 1 Combine Objects $D_1$ and $D_2$ $D_{12} \leftarrow$ trim $(D_1, D_2)$
$D_{21} \leftarrow$ trim $(D_2, D_1)$
If $D_{12}.d < D1.d$ and $D_1.d = D_2.d$ then
    Return merge_constraints(D21, D12)
else if $D_{12}.d = D_1.d$ and $D_{21}.d < D_2.d$ then
    Return merge_constraints $(D_{12}, D_{21})$
end if $D_{12}.d < D_{21}.d$ then
    Return merge_constraints $(D_{21}, D_{12})$
else
    Return merge_constraints $(D_{12}, D_{21})$
end if

FIG. 11

RANDOM-WALK BASED CAPACITANCE EXTRACTION WITH OPTIMIZED TRANSITION VOLUMES

FIELD

The present application relates to the field of computer-aided design of integrated circuits. More particularly, the present application relates to calculating capacitances for an integrated circuit design.

BACKGROUND

In order to design and manufacture integrated circuits (ICs), engineers use various CAD (computer-aided design) tools. One such technological tool, or category of tool, is capacitance extraction. Capacitance extraction is used to extract capacitances from an integrated circuit design, for example from a database representing an integrated circuit design as a semiconductor structure model. Extracted capacitances are then used in simulating circuits that are in the integrated circuit design, using yet another CAD tool such as a circuit simulator. Extracted capacitances can be parasitic capacitance or designed capacitance. With the results of such tool usage and related processes, engineers can then fine-tune the circuits in the circuit design, for example to meet design specifications, or determine specifications (e.g., signal propagation delays, signal rise and fall times, operating frequencies, power consumption, etc.) based on simulation.

One existing method only handles simplistic two-dimensional (2D) problems. Another existing method handles three dimensional (3D) problems, but does not support arbitrarily oriented obstacles. For other methods, the generated domains are not always optimal. Other existing methods for capacitance extraction, and related CAD tools and systems, strain memory usage and burden processing as integrated circuits increase in size, complexity, and density, and in view of the arrangements and shapes of geometries (e.g., polygons) in the layers of integrated circuits.

SUMMARY

Capacitance extraction with optimized transition volumes is performed in various embodiments, including a CAD method, a computer-readable media, and a CAD system.

One embodiment is a machine-implemented computer aided design (CAD) method for capacitance extraction. The method includes decomposing a semiconductor structure model representing a three-dimensional, into virtual layers. Each virtual layer has polygons corresponding to conductors in the semiconductor structure model. The semiconductor structure model or includes a geometric point. The method includes creating spatial indexes respectively for the virtual layers. Each spatial index indicates respectively for each spatial index cell of a corresponding virtual layer at least one candidate conductor of the corresponding virtual layer. The method includes creating optimal transition squares for the geometric point respectively for one or more consecutive virtual layers according to spatial indexes of the one or more consecutive virtual layers. The geometric point is located in one of the one or more consecutive virtual layers. The optimal transition squares are constrained by one or more candidate conductors of the one or more consecutive virtual layers. The method includes creating an optimal transition cube for the geometric point considering the one or more candidate conductors based on the optimal transition squares. The method includes calculating capacitance of the three-dimensional circuit using surfaces of the optimal transition cube.

One embodiment is a tangible, non-transitory, computer-readable media having instructions thereupon which, when executed by a processor, cause the processor to perform a method. The method embodied in the computer-readable media includes decomposing a semiconductor structure model representing a three-dimensional, into virtual layers. Each virtual layer has polygons corresponding to conductors in the semiconductor structure model. The semiconductor structure model or includes a geometric point. The method embodied in the computer-readable media includes creating spatial indexes respectively for the virtual layers. Each spatial index indicates respectively for each spatial index cell of a corresponding virtual layer at least one candidate conductor of the corresponding virtual layer. The method embodied in the computer-readable media includes creating optimal transition squares for the geometric point respectively for one or more consecutive virtual layers according to spatial indexes of the one or more consecutive virtual layers. The geometric point is located in one of the one or more consecutive virtual layers. The optimal transition squares are constrained by one or more candidate conductors of the one or more consecutive virtual layers. The method embodied in the computer-readable media includes creating an optimal transition cube for the geometric point considering the one or more candidate conductors based on the optimal transition squares. The method embodied in the computer-readable media includes calculating capacitance of the three-dimensional circuit using surfaces of the optimal transition cube.

One embodiment is a computer-aided design (CAD) system. The CAD system includes a memory and a processor. The processor is to perform a method that includes decomposing a semiconductor structure model representing a three-dimensional, into virtual layers. Each virtual layer has polygons corresponding to conductors in the semiconductor structure model. The semiconductor structure model or includes a geometric point. The method to be performed by the processor includes creating spatial indexes respectively for the virtual layers. Each spatial index indicates respectively for each spatial index cell of a corresponding virtual layer at least one candidate conductor of the corresponding virtual layer. The method to be performed by the processor includes creating optimal transition squares for the geometric point respectively for one or more consecutive virtual layers according to spatial indexes of the one or more consecutive virtual layers. The geometric point is located in one of the one or more consecutive virtual layers. The optimal transition squares are constrained by one or more candidate conductors of the one or more consecutive virtual layers. The method to be performed by the processor includes creating an optimal transition cube for the geometric point considering the one or more candidate conductors based on the optimal transition squares. The method to be performed by the processor includes calculating capacitance of the three-dimensional circuit using surfaces of the optimal transition cube.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 11 illustrates an example of the "combine" algorithm.

DETAILED DESCRIPTION

Figure 1A:
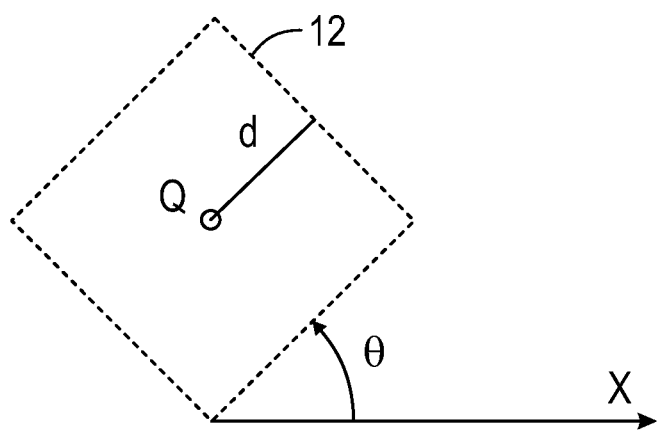
FIG. 1A illustrates the minimal information needed to uniquely characterize an empty square in 2D, or an empty cube in 2.5D, for embodiments.

Efficient optimal transition cube creation for random-walk-based capacitance extraction, and capacitance extraction with optimized transition volumes, are described herein in various embodiments including methods and systems for capacitance extraction from a 3D model of a circuit or a semiconductor structure model. A new method for the efficient optimal transition cube creation during capacitance extraction based on random walks is illustrated and described. This method provides for processing efficiency and efficient memory usage for capacitance extraction thereby decreasing CAD system requirements and costs or raising the ceiling on integrated circuit constraints that can be handled by a given CAD system, thereby advancing CAD system and integrated circuit capabilities Many computer aided design (CAD) methods and systems for capacitance extraction are memory intensive and computationally consumptive, especially for contemporary complex 3D IC (integrated circuit) designs, resulting in large memory requirements or limits to IC design and corresponding database size. Described in more detail below is a more computation and memory efficient capacitance extraction method, along with a related CAD tool and CAD system. In the various embodiments described herein, the 3D problem is divided into multiple 2D problems, and transition volumes (e.g., transition cubes) are assembled ("combined") vertically.

Presently described embodiments in capacitance extraction include creating transition cubes of different sizes and orientations, introduction of a new type of spatial index that is more efficient, and a new process for determining an optimal transition cube along a random walk, from which capacitance can be determined. First, the single, unified spatial index, utilizes multiple two-dimensional layers (and all directions relative to conductors, i.e., objects, in that layer) by virtue of the "divide" operation and outperforms prior CAD methods that use a replicated full three-dimensional index for each discrete direction, and resultant multiple basic memory amounts and multiples of computations. Second, through the "hegemony" relation, the new spatial index efficiently identifies for each of its spatial cells a set of neighboring conductors relevant to optimal transition cube creation for any of the points enclosed by the cell (these are referred to as candidate conductors in the literature), regardless of the orientation of the conductors' edges. This is advantageous over the "domination" relation of other implementations because the latter breaks down for arbitrarily oriented conductor edges. Finally, given a query point in space, optimal transition cube creation must simultaneously consider all candidate conductors provided by the spatial index. A naïve method to achieve this would be, given a query point in space, to sequentially examine all candidate conductors, while performing repeated passes over previously examined ones for each next candidate in the sequence. With the newly proposed "combine" operation, all candidate conductors are still examined, but suitable information is kept as state, such that the optimal results can be efficiently computed with a single pass over candidate conductors. The single, unified spatial index, the creation of optimal transition cubes through the combine operation, and further aspects described herein build on other methods for capacitance extraction that calculate capacitance between conductors using Monte Carlo integration and Green's function. Other methods do not decompose the 3D problem to multiple 2D ones.

Optimal transition cubes are strictly defined, and a novel spatial index data structure and query algorithm are designed, applicable regardless of the orientation of the edges of the conductors of the input design. The new spatial index takes advantage of the 2.5D nature of silicon chip designs and decomposes the original 3D problem into multiple 2D ones. Each 2D problem corresponds to a layer and all such layers are extracted beforehand from the design based on the conductors and dielectric media present and the existence of stacked conductor areas and vias. A novel query algorithm is introduced, able to optimally merge transition cubes across candidate conductors and across layers. The latter enables using multiple 2D spatial indexes for solving the general non-Manhattan problem, while preserving optimality of the result. Each 2D spatial index cell contains a list of conductors that may influence the creation of the optimal transition cube for any point within the spatial index cell area. This candidate list is determined efficiently using a newly introduced "hegemony" relation. The new approach exhibits substantial advantages over existing ones and enables efficient modeling of more complex designs, including 3D-IC designs.

In various embodiments, there are three main components that apply algorithms that are used together and codenamed "divide", "combine," and "hegemony" in a practical application to extract capacitances from a semiconductor structure model of a circuit (e.g., an IC design). These three components and the various embodiments described herein arise in a technological environment specific to computer aided design for integrated circuits in semiconductors with layers, as represented in a semiconductor structure model.

Various concerns, problems and considerations addressed by present embodiments are discussed below. Prerequisites for various embodiments are discussed with reference to FIGS. 1A-1F, followed by a description of algorithms for embodiments and explanations of terms. Present embodiments present technological solutions to problems discussed with reference to FIGS. 2-8L, and present technological advances and advantages as discussed with reference to FIG. 9. Further aspects and further depth of embodiments are described with reference to FIGS. 10-19. Further embodiments are described with reference to FIGS. 20 and 21.

One embodiment of a method, and one embodiment of a computer-based system that performs a method, includes the following input and output.

Input: A set of 2.5-D polygons (conductors) and a point in 3-D space. For example, the conductors are conductors in a semiconductor integrated circuit design, represented in a database.

Output: A 2.5-D cube centered at the point, such that it has i) maximum edge overlap with the conductors, ii) maximum surface area, subject to i) and iii) does not intersect the volume of any conductor. For example, the cube is a transition cube, or an optimal transition cube, as used in a method, system or CAD tool for capacitance extraction for the conductors in a semiconductor integrated circuit design.

Empty Square and Empty Cube Embodiments

FIG. 1A illustrates the minimal information needed to uniquely characterize an empty square in 2D, or an empty cube in 2.5D, for embodiments. This information is:

The center point Q of the empty square or cube 12.
The side length 2*d of the empty square or cube 12.
The angle of tilt θ of the empty square or cube 12 with respect to the x-axis of the standard Cartesian coordinate system.

The square or the 2.5D cube can be easily reconstructed given this minimal information. In the following, whenever there is mention of a cube, the cube may be termed a 2.5D cube.

Prerequisites

Figure 1B:
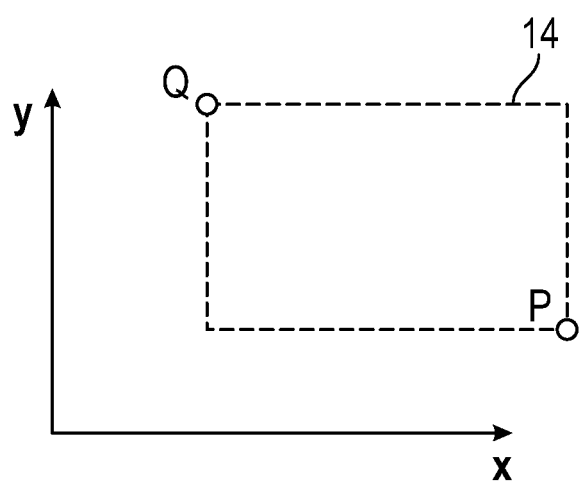
FIG. 1B illustrates how to find the l-infinity distance between two points P, Q in 2D, for embodiments.

FIG. 1B illustrates how to find the l-infinity distance between two points P, Q in 2D, for embodiments. This information and technique is used in Prerequisite 1.

Prerequisite 1: How to Find the l-Infinity Distance Between Two Points P, Q, in 2D:

Form the axis-aligned rectangle 14 that has the two points as upper-left and lower-right corners, or as lower-left and upper-right corners. Note that this rectangle 14 may deteriorate into an axis parallel line segment, if the two points have the same x or y coordinate. The l-infinity distance between the points is then the length of the largest of the two sides of the rectangle, in the above case $|P_x-Q_x|$.

Figure 1D:
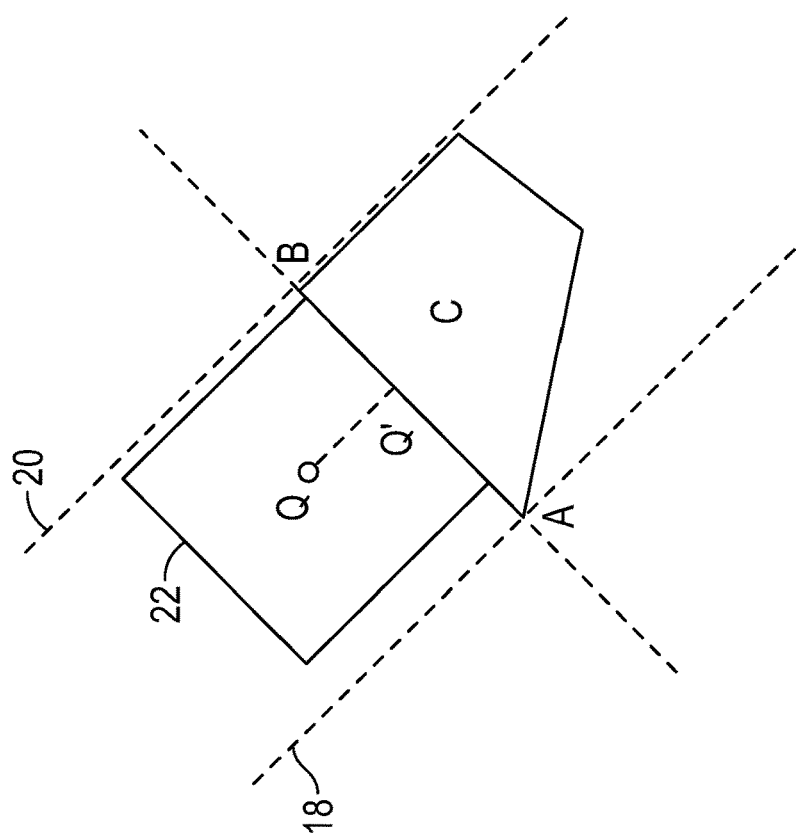
FIG. 1D illustrates a case in checking a given point Q against an edge of a conductor C, for embodiments.
Figure 1C:
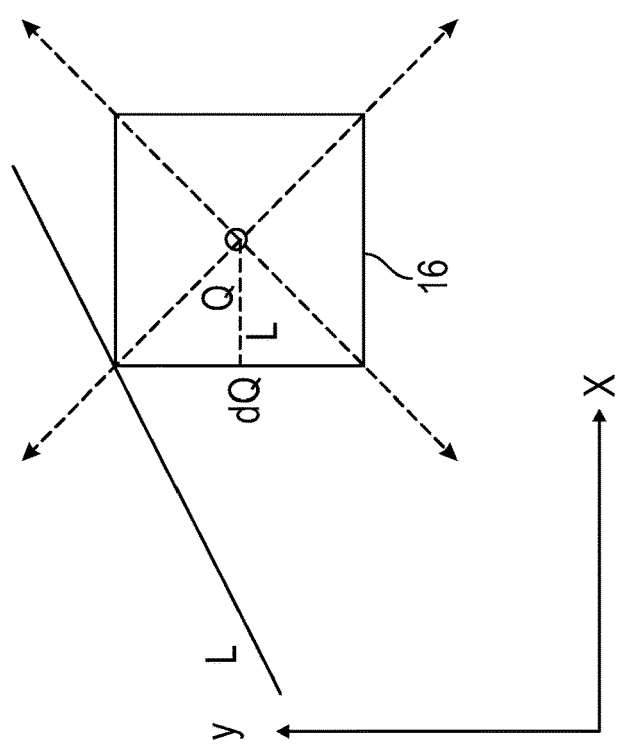
FIG. 1C illustrates how to find the l-infinity distance between two points P and a line L in 2D, for embodiments.

FIG. 1C illustrates how to find the l-infinity distance between two points P and a line L in 2D, for embodiments. This information and technique is used in Prerequisite 2.

Prerequisite 2: How to Find the l-Infinity Distance Between a Point Q and a Line L in 2D:

Shoot 2D rays, starting from Q and at angles 45, 135, 225, 315 degrees with respect to the x-axis of the standard coordinate system. These are shown in the figure as dashed lines. Then, form the smallest axis-aligned square 16 centered at Q with one of its corners at the intersection of these rays with the line L. Then half the edge length $d_{Q,L}$ of this square 16 (or cube) is the l-infinity distance between the point Q and the line L.

Figure 1F:
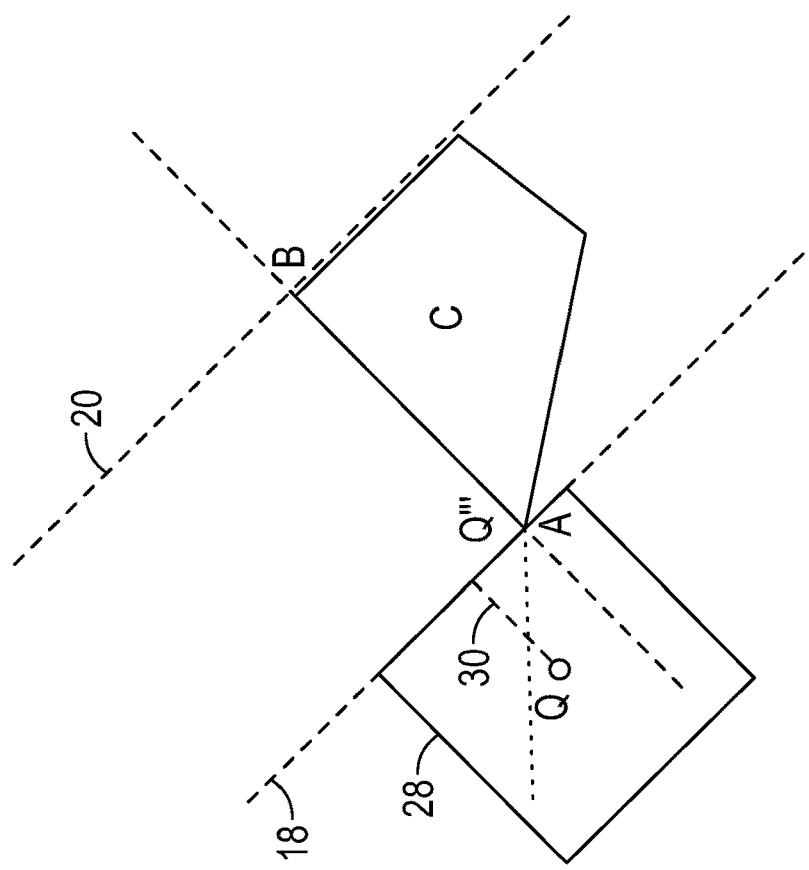
FIG. 1F illustrates a second subcase in checking a given point Q against an edge of a conductor C, for embodiments.
Figure 1E:
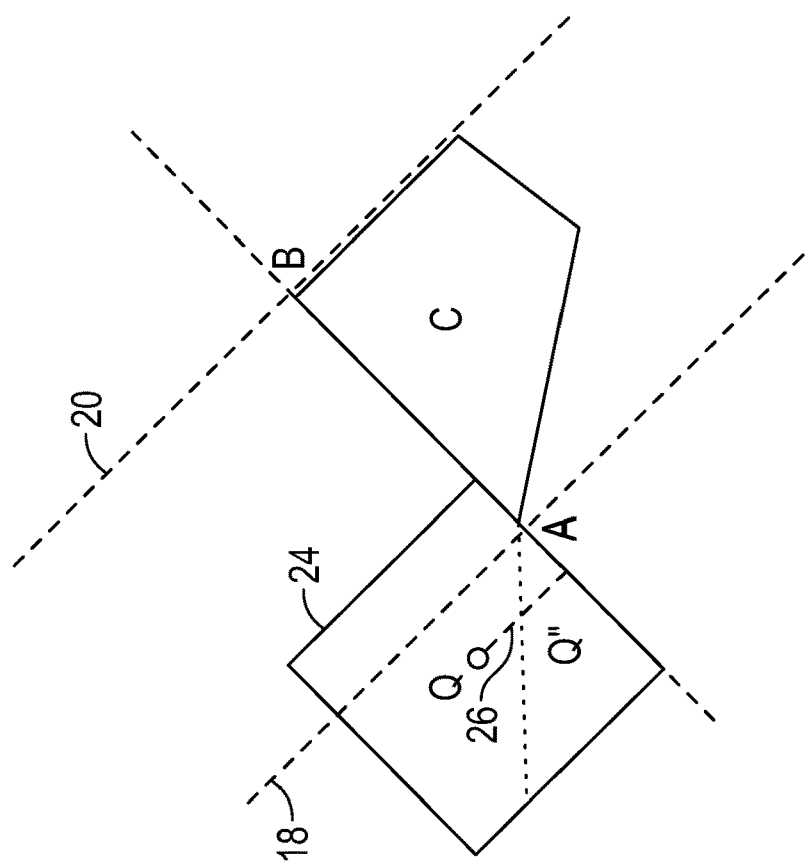
FIG. 1E illustrates a first subcase in checking a given point Q against an edge of a conductor C, for embodiments.

FIGS. 1D-F illustrate information and technique(s) used in Prerequisite 3.

Prerequisite 3: a Procedure that, Given a Point Q in 2D and a Convex Polygonal Conductor Shape C, Finds the Optimal Empty Square (or Cube) Centered at Q and not Intersecting the Volume of C.

Check the given point Q against every edge of the conductor C, in turn. For one of these edges, say AB, there may be the following cases:

FIG. 1D illustrates a case in checking a given point Q against an edge of a conductor C, for embodiments. Point Q is on the exterior half-plane of AB with respect to the shape C and does not lie outside the lines 18, 20 vertical to AB that are passing from A and B (shown dashed in the picture). In this case, the half-side of the optimal empty square 22 (or cube) is determined by the distance of Q to its orthogonal projection Q' onto AB, i.e., |QQ'|.

For another case, Point Q lies in the exterior half-plane of AB with respect to the shape C and lies outside the line vertical to AB passing from A. In this case, there are two subcases:

FIG. 1E illustrates a first subcase in checking a given point Q against an edge of a conductor C, for embodiments. If Q lies in the upper 45 degrees half-space of the right angle subtended by AB and the vertical line 18 passing from A, then the optimal empty square 24 (or cube) is determined by the distance of Q to its orthogonal projection Q" onto the AB line, i.e., the length of the line 26 |QQ"|. This case basically applies when Q is closer to the line 18 vertical to AB and passing from A than to the AB line. This is depicted in the left portion of the figure above.

FIG. 1F illustrates a second subcase in checking a given point Q against an edge of a conductor C, for embodiments. If, on the other hand, Q lies in the lower 45 degrees half-space of the right angle subtended by AB and the vertical line 18 passing from A, then the optimal empty square 28 (or cube) is determined by the distance of Q to its orthogonal projection Q'" onto the line 18 vertical to AB and passing from A, i.e., the length of the line 30 |QQ'"|. This case basically applies when Q is closer to the AB line than to the line 18 vertical to AB and passing from A. This is depicted on the right portion of the figure above.

Point Q lies in the exterior half-plane of AB with respect to the shape C and lies outside the vertical line to AB passing from B. This case is analogously identical to the immediately preceding one regarding the vertical line 18 passing from A, if the line 20 vertical to AB and passing from B is considered.

Point Q lies in the interior half-plane of AB with respect to the shape C. In this case, the optimal empty square (or cube) is not determined by the edge AB, but rather from another edge.

All the edges of conductor C are checked against Q and the one that gives a square (or cube) of minimal edge length is kept as the final optimal empty square (or cube).

Algorithmic Embodiments

Various embodiments include some or all of the following algorithmic steps or actions, in various combinations:
  a. Preprocessing (spatial index creation)
  b. Identify virtual layers in z-axis.
  c. Create a 2-D spatial index in each layer. This should be a spatial partitioning data structure, i.e., it should index all points in 2-D space and should be based on non-overlapping rectangular cells. Examples of such a data structure are a 2-D grid, quadtree, R-tree, kdtree or combination(s) thereof.

Grid-Quadtree Embodiment

To elaborate on a specific efficient implementation, assume that each 2-D spatial index is a grid-quadtree:
  The 2-D plane is divided to grid cells and a separate quadtree is constructed in each grid cell. The quadtree in each grid cell basically partitions the 2D space delimited by the grid cell. Each quadtree has its own internal cells and these are the cells referenced hereinafter as "quadtree cells".
  All conductors of a 2D layer are to be inserted to all quadtrees of the layer, but, eventually, each of the quadtree cells will store only those conductors that should be considered to create the optimal transition square for any point within this quadtree cell. These are called "candidate conductors" for this quadtree cell.
  There are several initial optimizations, some of which may be found in the literature, such that a quick decision can be made on whether a conductor should even be checked for inclusion in the candidate list of a quadtree cell. For example, a conductor whose 2D bounding box volume does not intersect the volume of a grid cell, does not have to be inserted at all to the quadtree of that grid cell. The same holds for the bounding box of a conductor and the volume of a quadtree cell. There is also a "distance limit" optimization described in C. Zhang & W. Yu, *Efficient Space Management Techniques for Large Scale Interconnect Capacitance Extraction With Floating Random Walks*, IEEE Trans. Comput. Aided Des. Integr. Circuits Syst. 32 (10): 1633-1637 (2013), specific to this problem, that basically keeps a running maximum distance of any candidate conductor stored in the list to any point internal to the quadtree cell, so that a new conductor can be rejected immediately if its minimum distance to the cell exceeds this limit. These optimizations for conductor inclusions and candidate lists may be included in various present embodiments that also include further mechanism(s) described herein. Below, conductors that already pass these initial checks are described with respect to a quadtree cell, in an embodiment.

To insert a new such conductor in a quadtree cell, the hegemony relation must be pairwise checked between it and all candidate conductors currently stored in the cell. A new conductor is inserted as a candidate in the cell, only if it is not hegemonized by any of the conductors currently stored in the cell. Conversely, if a conductor currently stored in the cell is hegemonized by the new candidate, it is removed from the candidates of the cell.

Hegemony Relation Checking

The hegemony relation is checked for a new conductor, as follows:
  The new conductor is given as input to a quadtree cell, e.g., one of the candidate conductors of this cell is called A, and the new conductor to be checked to see if it is hegemonized by A, is called B.
  Begin from the upper left corner of the cell and create the optimal empty square centered at the corner which does not intersect A. This can be accomplished by prerequisite 3 described at the beginning of the section. Then, find the circumscribed circle of this square.
  If the volume of the circle intersects the volume of B, then A does not hegemonize B, so proceed to checking B for hegemony against the next candidate conductor stored in the cell (i.e., no longer A).
  If the volume of the circle does not intersect the volume of B, then select a new point on the boundary of the quadtree cell by traversing it clockwise (in some embodiments, or other direction in further embodiments) in discrete steps. The distance of one point selected on the boundary to the next point selected on the boundary is equal to the radius of the latest constructed circumscribed circle of the optimal empty square with respect to A, or the distance to the next corner of the cell, whichever is smallest.
  At this new point of the boundary of the cell, repeat the procedure from above to construct the circumscribed circle of the optimal empty square centered at this point which does not intersect A. Then, iterate as many times as needed to either find a circle that does intersect B, or to traverse the full boundary of the cell and come back to the starting point, i.e., the upper left corner of the cell.
  If this traversal of the boundary of the quadtree cell finishes and no circumscribed circle along the way has intersected B, then A hegemonizes B for this quadtree cell. In this case, B does not need to be checked against any of the remaining candidates stored in the cell. It is essentially deemed not relevant to this spatial index cell for optimal empty square construction purposes.

The hegemony relation may be carried out for all applicable quadtree cells, for all quadtrees, and for all conductors in the design.

Construction of the 2-D spatial index for each layer is efficient, because of the hegemony relation, that checks only a few points on the boundary of each spatial index cell, roughly in the order of the number of cell corners. Also at runtime, without hegemony, potentially all conductors of the layer would have to be checked for each quadtree cell.

Runtime (Capacitance Extraction) Embodiment

Given a query point Q in 3-D space.

Find the virtual z-axis layer that contains it.

Within the grid-quadtree of that layer, find the quadtree cell that contains the point. There is going to be a unique such cell because the grid-cells are non-overlapping as are the quadtree cells within a quadtree of a grid-cell.

Pick the first conductor in the candidate list of the quadtree cell and find the optimal empty square centered at the query point and constrained by this conductor. This can be accomplished by prerequisite 3 described at the beginning of the section.

Store the side length of the optimal empty square, its angle of tilt and the id of the conductor in the candidate list that was used to construct the optimal empty square. Here, an additional piece of information is to be stored with respect to a simple empty square, which is the conductor ID, (or eventually conductor IDs), that was used to construct the optimal empty square.

Successively refine (or constrain) the empty square by applying the following procedure to all other conductors in the candidate list of the quadtree cell. This can be done as follows:

Candidate conductors in the list are checked sequentially, i.e., one by one.

At each point of the procedure, the center Q of the optimal empty square is fixed, since it is always the query point Q. The properties of the optimal empty square that can change when considering more and more conductors are its side length and angle of tilt. If the currently checked conductor does require an update of either the side length or the angle of tilt of the preceding optimal empty square, then its id is stored in the list of conductors that have contributed to the construction of this empty square. It will also become apparent that in the process of determining the optimal empty square, IDs of conductors may also be removed from (not just added to) the list of conductors that constrain it.

Hence, at each point of the procedure, after each conductor is checked, there is always a valid optimal empty square corresponding to the already checked conductors, with possibly updated side length and angle of tilt with respect to the preceding optimal empty square. This is uniquely characterized by its side length, its angle of tilt with respect to the x-axis of the standard Cartesian coordinate system and the conductor ids that have required an update to its side length and/or its angle of tilt, i.e., that have constrained it.

Optimal Empty Square Refinement Embodiment

How to refine the current optimal empty square, with side length 2*d, angle of tilt θ, and list of conductors Cond_list when seeing a new conductor, e.g., called C is described below:

Refining the optimal empty square with respect to the l-infinity metric, is not, in general, a commutative procedure. If an optimal empty square refinement process has a current optimal empty square along with a list of conductors that have contributed to the current optimal empty square, e.g., the list of conductors called Cond_list, and tries to incorporate a new conductor C to the list of conductors, the process may well get a different empty square than if the process had started with the optimal empty square to just conductor C and then tried to incorporate all conductors in Cond_list to a new or alternative list of conductors. Only one of these final squares is actually optimal for the set of conductors {Cond_list, C} and the process compares them to each other. For this reason, the process performs a refinement procedure that considers both incorporation directions, i.e., Cond_list<-C and C<-Cond_list, described below as forward direction and reverse direction.

Forward Direction

First, examine the "forward" incorporation direction, Cond_list<-C. Find the radius of the circumscribed circle of the empty square of side length 2*d and angle of tilt θ. Call this radius R.

Then, construct the optimal empty square at Q assuming the only conductor present is C. This can be accomplished by prerequisite 3 described at the beginning of the section.

If the half side length of the optimal empty square constrained by just C, $d_C$, is larger than the radius R, then the process need no longer consider C for construction of the empty square in the "forward" direction. C is too far away from Q to play a further role.

If the half side length of the optimal empty square constrained by just C, $d_C$, is smaller than the radius R, then C is close enough to be considered. Start checking the edges of C, one by one, at each step regarding the square of side length 2*d and angle of tilt θ as reference. Consider an edge of C, say AB. Shoot 2D rays, starting from Q and at angles θ+45, θ+135, θ+225, θ+315 degrees with respect to the x-axis of the standard coordinate system. This tries to achieve the same as prerequisite 2 described at the beginning of the section, however, it is applied with respect to a coordinate system tilted by angle θ, i.e., aligned to the current fixed empty square. If one or more of these rays hit AB, then the process notes the intersection point such that its distance from Q is minimum among all such ray-AB intersection points. This distance can be regarded as the radius of a circle circumscribing a square, call it R'. The half side length of the circumscribed square will then be R'/√2. The process also notes the l-infinity distances $d_{QA}$ and $d_{QB}$ of point A to point Q and of point B to point Q, after expressing both points A and B with respect to the coordinate system tilted by angle θ, i.e., aligned to the current fixed empty square. To do this, the process applies prerequisite 1 described at the beginning of the section, after rotating A and B around Q by −θ. Finally, among all these distances, the process keeps the minimum, i.e., $d_F$=min (R'/√2, $d_{QA}$, $d_{QB}$) (the F subscript here stands for "forward" direction). If $d_F$ is smaller than d*√2, then the process adds the id of C to an output list of conductors which may affect the optimal empty square. If, additionally, de is smaller than d, then the process stores de itself and notes the fact that the current optimal empty square needs to change to accommodate C.

As mentioned already, the process performs the above operations individually for each edge of C. At each step, the process keeps the minimum de across all checked edges, while the output list keeps all conductors seen so far that may affect the optimal empty square. In summary, after going through all edges of C, the final outputs of this step are $d_F$ and θ, the union of Cond_list with the additional conductors that were found to maybe affect the optimal empty square construction, call it Cond_list$_F$, and a flag Change$_F$ indicating whether $d_F$ is different from d. Note that the angle of tilt θ cannot have been changed by the above steps, it was always fixed.

Reverse Direction

Next, the process examines the "reverse" incorporation direction, C←Cond_list. This, although distinct, shares analogies with the previous "forward" direction. This is because Cond_list can essentially be thought of as a "virtual" conductor with optimal empty square of side length 2*d, angle of tilt θ and edge set the union of all edges of all conductors in Cond_list.

First, in analogy to a corresponding step in the previously considered "forward" direction, the process constructs the optimal empty square at Q assuming the only conductor present is C. The half side length of this optimal empty square has already been called dc and further call its angle of tilt $θ_C$.

Then, in analogy to a corresponding step in the previously considered "forward" direction, the process finds the radius of the circumscribed circle of this optimal empty square, call it $R_C$.

In analogy to a corresponding step in the previously considered "forward" direction, if the half side length of the optimal empty square constrained by Cond_list, d, is larger than the radius $R_C$, then the process need no longer consider Cond_list for construction of the optimal empty square in the "reverse" direction. All its constituent conductors are too far away from Q, given C now comes into play, to play a further role.

In analogy to corresponding steps described above, if the half side length of the optimal empty square constrained by Cond_list, d, is smaller than the radius $R_C$, then some or all constituent conductors of Cond_list are close enough to be considered. Now, start checking all edges of all conductors in Cond_list one by one, at each step regarding the square of side length 2*$d_C$ and angle of tilt $θ_C$ as reference. For each such edge, perform the exact same manipulations described in steps 5 and 6 with this empty square now as reference (i.e., coordinate systems are now rotated by $θ_C$, as opposed to θ, etc.): keep the minimum distance $d_R$ across all edges of all conductors in Cond_list and an output list of conductors encountered along the way that may affect the optimal empty square (the "R" subscript here stands for reverse direction). The final outputs of this step are $d_R$ and $θ_C$, the union of C with the additional conductors that were found to maybe affect the optimal empty square construction, call it Cond_list$_R$, and a flag Change$_R$ indicating whether $d_R$ is different from $d_C$. Note that the angle of tilt $θ_C$ cannot have been changed by the above steps, it was always fixed.

Resolving Forward Direction and Reverse Direction Properties

Now the process has two sets of properties, one for the "forward" incorporation direction {Change$_F$, $d_F$, θ, Cond_list$_F$} and one for the "reverse" direction {Change$_F$, $d_R$, $θ_C$, Cond_list$_R$}. First, the process creates a set composed of the union of all conductors in Cond_list$_F$ and Cond_list$_R$ after removing duplicates, call this Cond_list$_M$ (the "M" subscript stands for merge). Next, if Change$_F$ is false and Change$_F$ true, i.e., if incorporation in the forward direction does not change the corresponding optimal empty square side length and it does in the reverse direction, then the new optimal empty square is defined by {$d_F$, θ, Cond_list$_M$}. Conversely, if Change$_R$ is false and Change$_F$ true, i.e., if incorporation in the reverse direction does not change the corresponding optimal empty square side length, and it does in the forward direction, then the new optimal empty square is defined by {$d_R$, $θ_C$, Cond_list$_M$}. If Change$_R$ and Change$_F$ are both false, then the new optimal empty square is determined by the largest side length, i.e., it is either {$d_F$, θ, Cond_list$_M$}, if $d_F$ is larger than $d_R$ or {$d_R$, $θ_C$, Cond_list$_M$}, if $d_R$ is larger than $d_F$.

Optimal Empty Square

At this point, the process has found the optimal empty square {$d_k$, $θ_k$, Cond_list$_k$} in the virtual layer that contains the query point, say $L_k$. By considering the z coordinate of Q, and keeping its xy coordinates fixed, the process can project Q onto different virtual layers. The process identifies the next nearest virtual layer towards higher z compared to $L_k$, say $L_{k+1}$ and call the projection of Q onto $L_{k+1}$ Q'. Q' should have the closest possible z coordinate among all projections of Q onto $L_{k+1}$. The z-axis distance of Q' vs Q will be $d_{Q'}=|z_{Q'}-z_Q|$.

If $d_{Q'}$ is larger than the radius of the circumscribed circle to the current optimal empty square, i.e., if $d_{Q'}$√$d_k$*√2, then the query in higher z coordinates is completed. Now the exact same check should be performed on the next nearest virtual layer towards lower z compared to $L_k$, say $L_{k-1}$. The projection of Q onto $L_{k-1}$ should have the closest possible z coordinate among all projections of Q onto $L_{k-1}$. If the distance of Q to this projection is also larger than $d_k$*√2 then the whole query has finished and the optimal empty cube is {$d_k$, $θ_k$}(recall that unique representation for optimal 2.5D cubes is the same as for optimal squares).

Otherwise, if $d_{Q'} < d_k$*√2 then the process finds the optimal empty square within layer $L_{k+1}$ independently according to corresponding steps described above, say ($d_{k+1}$, $θ_{k+1}$, Cond_list$_{k+1}$). If now $d_{k+1}$ is larger than the radius of the circumscribed circle of {$d_k$, $θ_k$, Cond_list$_k$}, i.e., if $d_{k+1}>d_k$*√2, then layer $L_{k+1}$ does not constrain the currently optimal empty cube in the xy coordinates, so the process moves to even higher z, say to layer $L_{k+2}$ and performs the above checks all over again. Specifically, the process finds the projection of Q onto $L_{k+2}$, call it Q". If $d_{Q''}=|z_{Q''}-z_Q|>d_k$*√2 then layers $L_{k+2}$ and higher are not relevant to constructing the optimal empty cube, and the search towards higher z has finished with optimal empty cube {$d_k$, $θ_k$, Cond_list$_k$}.

Suppose now that $d_{k+1}<d_k$*√2 then the process must combine optimal empty squares {$d_k$, $θ_k$, Cond_list$_k$} to {$d_{k+1}$, $θ_{k+1}$, Cond_list$_{k+1}$} going through corresponding steps described above. It is important to note that the forward and reverse directions now both have lists of conductors to compare against and not just single conductors. This is a generalization of the analogy mentioned above, whereby a triplet {d, θ, Cond_list} can be thought of as the optimal empty square corresponding to a "virtual" conductor with edges the union of all edges of conductors in Cond_list. Call this refined optimal empty square {$d_{comb}$, $θ_{comb}$, Cond_list$_{comb}$}. If $d_{comb}<d_{Q'}$, the combined square is actually too pessimistic, since the process has been allowed to touch Q' along the z axis, hence the currently valid optimal empty cube will be {$d_{Q'}$, $θ_{comb}$, Cond_list$_{comb}$}. Otherwise, i.e., if $d_{comb}>d_{Q'}$, then the currently valid optimal empty cube will be {$d_{comb}$, $θ_{comb}$, Cond_list$_{comb}$}.

Finally, the process performs corresponding steps for each next nearest virtual layer, until the process finds virtual layers for which the condition $d_{Q'...}>d_k$*√2 holds, both towards higher z and towards lower z compared to $L_k$ (i.e., the process should find one such layer for higher z and one for lower z). In that case the process need not check any more virtual layers and the optimal empty cube is defined by the latest valid triplet {d, θ, Cond_list}.

Additional Considerations for Various Embodiments

Embodiments may include various combinations of the following.

High level description of defining an optimal transition square: given N 2D obstacles each with one orientation per edge.

Constructing N initial optimal transition squares, individually for each of N obstacles w.r.t. a 2D point, each such square oriented with one edge of its respective obstacle and not intersecting the volume of the obstacle.

Then adjust (decrease) only the size of each initial optimal transition square w.r.t. all other N−1 obstacles so that each adjusted square has the largest size with which it does not intersect the volume of any of the other N−1 obstacles. The size can only decrease here, because, if it increased, the adjusted square would immediately intersect the volume of its respective obstacle.

The optimal square is then the largest one among all adjusted transition squares, because after adjustment, all such squares are individually small enough to not intersect the volume of any of the N obstacles, so the largest of them is still a valid square. This is the optimal transition square provided by various embodiments of method and system.

Technical Terms

Explanation of the term "single index":

"Single index" means each conductor is inserted once into one (i.e., a single) spatial index. In present embodiments, there is one (i.e., a single) in-memory spatial index for each virtual layer, where candidate conductors from that virtual layer only are stored, regardless of orientations present in those conductors. By contrast, the method set forth in U.S. Pat. No. 10,013,522, issued Jul. 3, 2018, of Visvardis et al. needs to construct multiple (i.e., more than one) separate in-memory spatial indices to store candidate conductors from the whole design, where each such spatial index measures distances according to a particular orientation present in the design. So, in the embodiment of the present invention, there is one spatial index per virtual layer, each index containing only conductors of that virtual layer as candidates, hence each conductor is inserted once into one of these spatial indices (the one that pertains to its virtual layer). In contrast to presently described embodiments, other methods have one spatial index per distinct orientation, each index containing all conductors of the whole design as candidates, hence each conductor is inserted into as many separate spatial indices as there are orientations.

One should not make the mistake of thinking that such contrasting methods partition the conductors with respect to orientation and then insert only them to the respective spatial index. Contrasting methods do not, but instead, all conductors are inserted into all spatial indices. Nevertheless, their final candidate status is different according to the distance metric defined by the orientation characterizing that spatial index.

A conductor may also have to be inserted in more than one spatial index, because some conductors (e.g., vias-stacking, see explanation with reference to FIG. 9 of Divide—Decomposition to multiple 2D indices) can be present in more than one virtual layer. Conductors that belong to a single virtual layer are still inserted only to the spatial index pertaining to that virtual layer. Also, it still holds that the spatial index of each virtual layer is just one, and not multiple separate indices one for each distinct orientation present in the layer.

Additional Clarification of Aspects of Embodiments

The disclosed mechanism identifies virtual layers in the z axis, then finds one optimal square in each of some—ideally not all—consecutive virtual layers and then is able to extend these optimal squares into an optimal 2.5D cube. Only a single index is constructed for all directions efficiently with the hegemony relationship (e.g. for a 2D virtual layer). Optimal squares of individual arbitrarily oriented conductors are combined during run time to produce a single optimal square within a virtual layer. Optimal squares of multiple virtual layers are extended into a 2.5D cube (i.e., combining optimal squares of individual virtual layers across the z-axis).

Embodiments and Technology

Description of various embodiments, technological problems, technological solutions and technological advantages follows. Random walk has been used in some other methods, and is herein used in some embodiments, with various mechanisms, for finding transition domains, transition squares, transition cubes, and optimum versions thereof.

Random-walk based methods for solving PDEs exhibit significant advantages and applicability to numerous domains. One of these is parasitic capacitance extraction in modern silicon technologies, where these methods are essentially called upon to solve an elliptic-type boundary-value problem.

Random Walk Capacitance Extraction, for Some Embodiments

Figure 2:
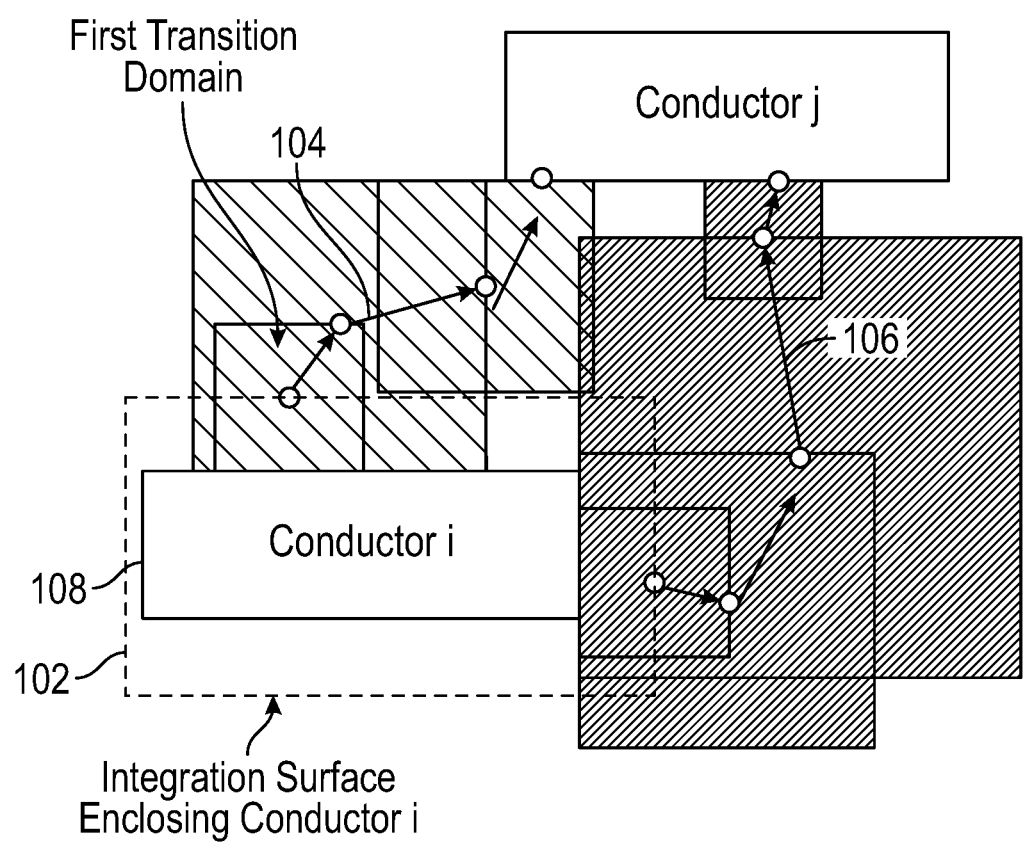
FIG. 2 is an illustration of capacitance extraction based on random walks. The dotted rectangle denotes the Gaussian surface around conductor i whereas shaded squares denote transition squares generated during two random walks.

FIG. 2 illustrates the floating random walk process for capacitance extraction. FIG. 1G is an illustration of capacitance extraction based on random walks 104, 106 denoted by sequences of arrows. The dotted rectangle 102 denotes the Gaussian surface around conductor i 108 whereas shaded squares denote transition squares generated during two random walks. Dotted rectangle 102 is an integration surface enclosing conductor i 108, and integrating around this surface is one way that the charge on conductor i 108 can be deduced. Electric field and voltage potential at any point in space, including points on a periphery of a transition domain, is related to the charge on the conductor(s). Using these relationships of charge and voltage for conductors, capacitance between conductors can be determined. Each step on a random walk 104, 106 points to a point in space that is surrounded by a transition domain, in various embodiments a transition square in two dimensions and a transition cube in three dimensions.

Crucial to this operation is the efficient creation of optimal transition cubes (hereafter more generally named transition domains) at any given point in the free space between conductors in order to advance the random walks.

Utilize random walks in order to solve PDEs. For the electrostatic problem, an elliptic-type equation is solved in a finite domain governed by Dirichlet boundary conditions.

The fundamental RW formula that gives the potential at point r is:

$$\phi(r) = \oint_{S_1} G_{(r,r_1)} \oint_{S_2} G_{(r_1,r_2)} \ldots \oint_{S_n} G_{(r_{n-1},r_n)} \phi(r_n) dr_n \ldots dr_2 dr_1$$

Based on Gauss's law, the charge enclosed inside a closed surface G around conductor i, will be:

$$Q = \oint_G D_{(r)} dr = \oint -\varepsilon_{(r)} (\nabla \phi_{(r)} \cdot \vec{n}_{(r)}) dr$$

A process can calculate the capacitance between conductors i and j using Monte Carlo integration as:

$$C_{ij} = \frac{Q_{ij}}{1} = \frac{1}{N} \sum_{n=1}^{N} \omega_n$$

where $$\omega_{(r,r_1)} = \frac{-G_{(r,r_1)} \cdot \vec{n}_{(r)}}{gG_{(r,r_1)}}$$

G is the surface Green's function for the transition domain, which can be used as a Probability Mass Function (PMF), after discretizing the surface.

Figure 3:
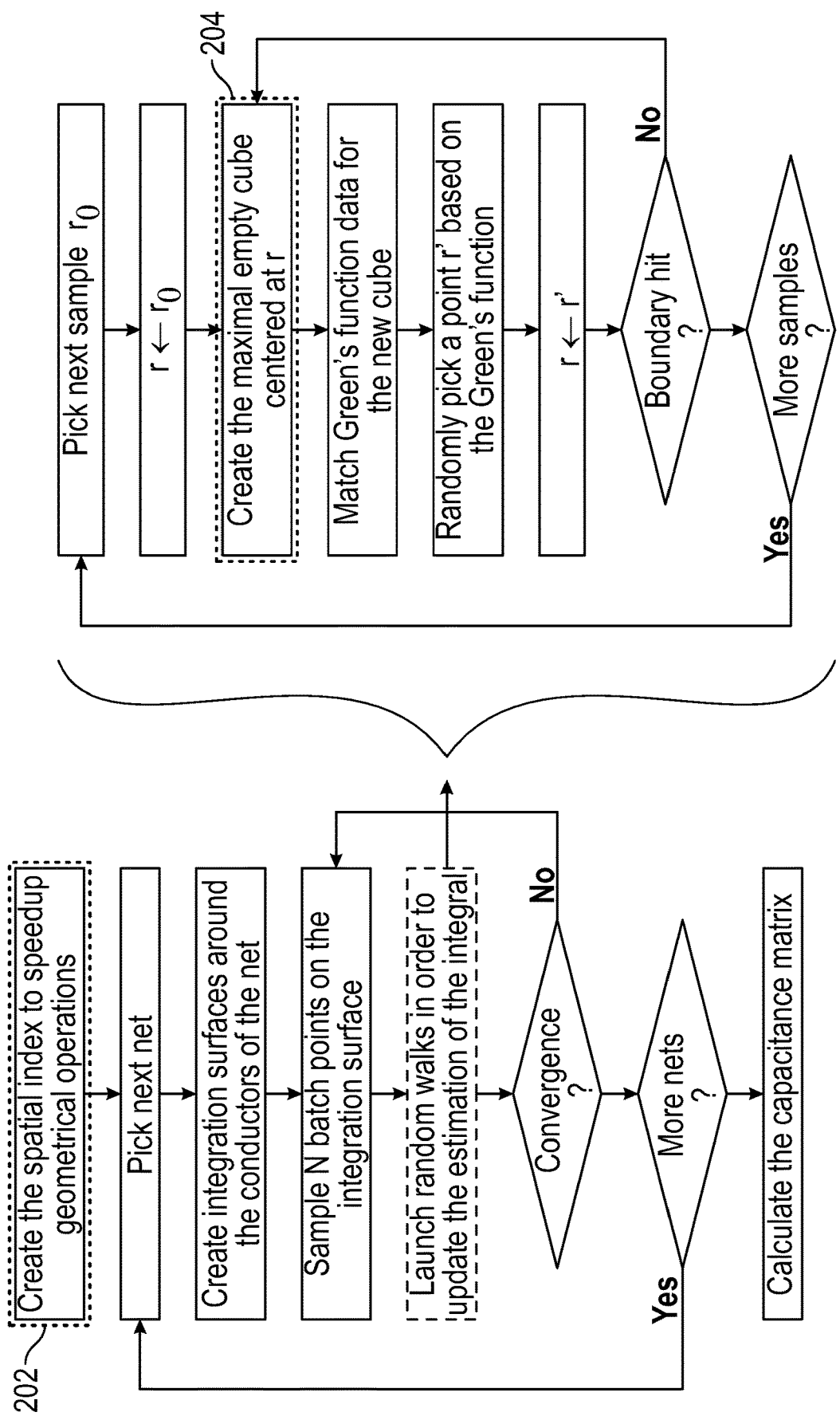
FIG. 3 is an example random-walk-based capacitance extraction flowchart. The parts related with optimal transition domain creation are highlighted with an outer box.

FIG. 3 is an example random-walk-based capacitance extraction flowchart. The parts related with optimal transition domain creation are highlighted with an outer box.

In FIG. 3, the flowchart of the floating random walk method for capacitance extraction is presented where the steps related with optimal transition domain creation are highlighted with an outer rectangle box 202, 204. One such step, highlighted with the outer rectangle box 202, is "create the spatial index to speed up geometrical operations". Another such step, highlighted with the outer rectangle box 204, is "create the maximal empty cube centered at r". The maximal empty cube referred to thereby is an optimal transition domain, determined along the random walk.

The term conductor and the term obstacle may be used interchangeably to describe a convex polygonal prism. Conductors may also be abutting, but not intersecting. A transition domain:

Must be centered around a given point.
Should not contain conductors. A more precise definition of this is that the boundary of a conductor may overlap with the boundary of the transition domain, at a continuum of points forming a straight segment in 2D or a plane in 3D, or at countably many isolated points in 2D or 3D. What is not allowed is for any interior point of a conductor to be topologically interior to the transition domain and vice-versa, according to the standard topology in $R^2$ or $R^3$. In other words, the boundaries of a transition domain and a conductor may be abutting or touching or intersecting with an intersection of zero volume, but not intersecting with an intersection of non-zero volume.
The shape and size of transition cubes affect random walk performance. In most cases the larger the domain or the larger the overlap of its perimeter with an obstacle, the faster, or otherwise with fewer hops, a walk finds a target.
Since VLSI chips consist primarily of conductors with convex polygonal xy cross-sections, cubic as opposed to spherical transition domains are preferred. More precisely, maximal cubic transition domains are sought after: cubic in order to maximize possible domain-obstacle perimeter overlaps and maximal in order to minimize the number of hops leading to walk termination.

Figure 4:
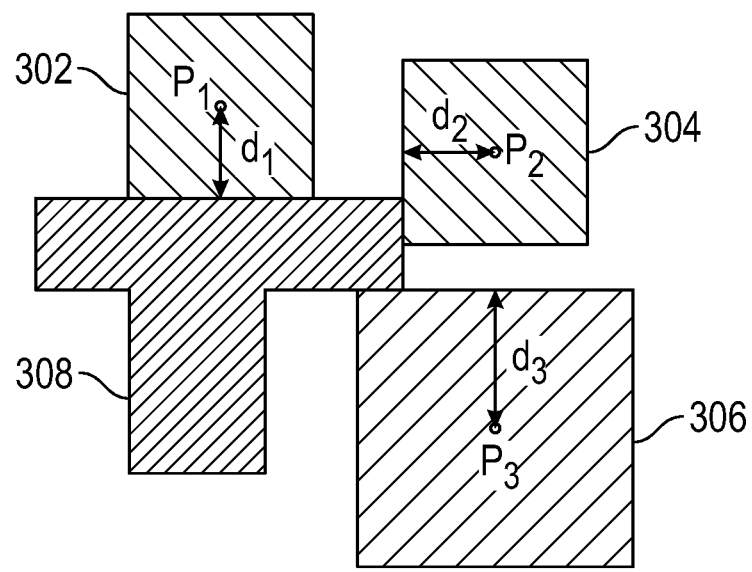
FIG. 4 illustrates transition square examples for the Manhattan case. Finding the Chebyshev distances d1, d2 and d3 suffices in order to create the transition squares P1, P2 and P3 respectively.

In the simplest case Manhattan-only conductors are present in the input design. FIG. 4 illustrates examples of such transition domains (in 2D for simplicity). The problem reduces to finding the nearest neighbor obstacle face based on the $L_\infty$ metric.

Transition Cube Generation Problem—Manhattan-Only Case

FIG. 4 illustrates transition square examples for the Manhattan case. In the Manhattan case, various geometries (e.g., polygons representing conductors in an IC design) are aligned, e.g., along an orthogonal XY grid analogous to buildings and avenues in Manhattan. The Manhattan case does not support rotated geometries (see FIG. 5), nor smoothly rounded geometries. Finding the Chebyshev distances d1, d2 and d3 suffices in order to create the transition squares P1 302, P2 304 and P3 306 each aligned to and touching an edge of a polygon representing a conductor 308, respectively.

In the Manhattan-only case the maximal conductor-free cube around any point in the free space between conductors is the optimal transition cube and the problem reduces to finding the nearest neighbor obstacle face based on the $L_\infty$ metric. A spatial index is needed to facilitate nearest neighbor queries.

Figure 5:
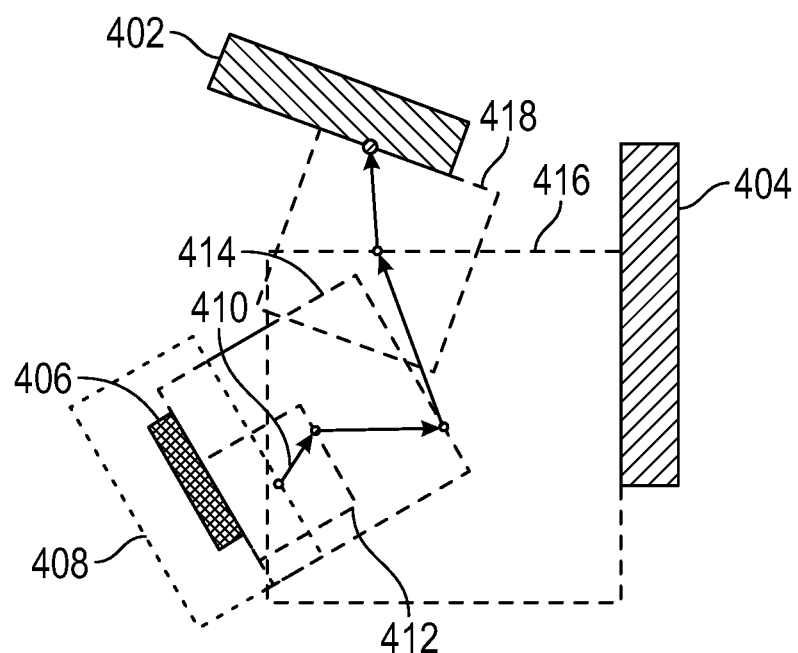
FIG. 5 illustrates rotated transition domain examples for a design with arbitrarily oriented obstacles. The generated domain must inherit the direction of the constraining obstacle edge.

The problem gets more complex in case non-Manhattan obstacles are present. For such cases efficient modeling is achieved by utilizing rotated transition domains. FIG. 5 illustrates the concept of rotated transition domains. The problem can no longer be reduced to finding the nearest obstacle based on the $L_\infty$ because the latter is not rotationally invariant.

Transition Cube Generation Problem—Non-Manhattan Conductors

FIG. 5 illustrates rotated transition domain examples for a design with arbitrarily oriented obstacles (e.g., geometries representing conductors 402, 404, 406 in an IC design). This is the generalized case addressed by present embodiments. The generated domain must inherit the direction of the constraining obstacle edge. In this example, one of the conductors 406 has a Gaussian surface 408 surrounding the conductor 406. A random walk 410 establishes successive transition domains 412, 414, 416, 418 that can be rotated relative to the orientation of the original conductor 406, and can be aligned to and touching edges of conductors 402, 404 that are candidate obstacles for the random walk 410. In this example, the random walk 410 starts with a transition domain 412 that is aligned to and touching an edge of the conductor 406, and the random walk 410 continues with a transition domain 416 aligned with and touching an edge of one conductor 404, and terminates with another transition domain 418 aligned with and touching an edge of another conductor 402.

Aspects of Technological Solutions

Various embodiments have some or all of the following aspects:

Introduce the notion of rotated transition cubes.
Support designs with arbitrarily oriented (non-Manhattan) conductors without compromising performance on Manhattan-only designs.
Better definition: Create the conductor-free cube that maximizes the probability of terminating a random walk with fewer steps/hops.
Note: Unlike $L_2$, the $L_\infty$ metric is not rotationally invariant—different distance values per coordinate system.
Regarding optimality, consider the problem in FIG. 6, which is further discussed with reference to FIGS. 7-15.

Optimal Transition Cube Creation Examples

Figure 6:
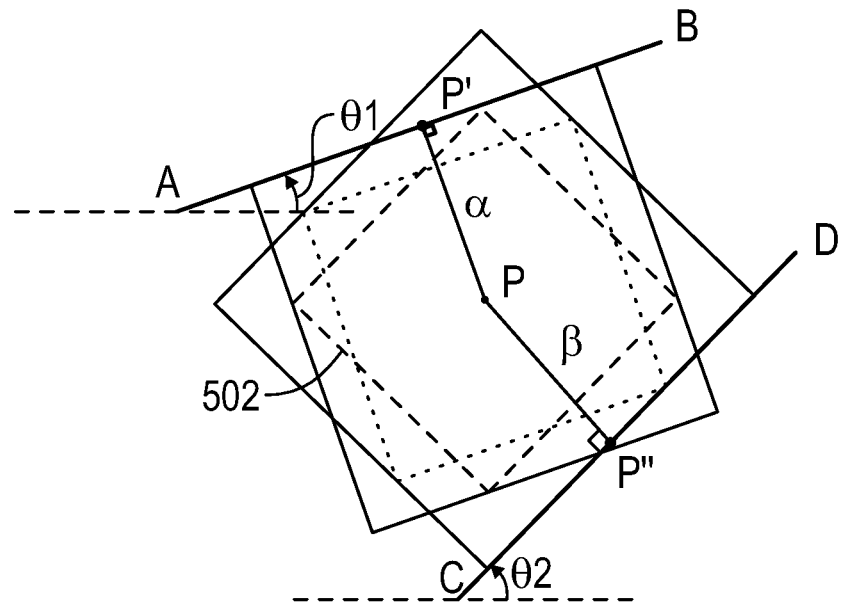
FIG. 6 is an example illustrating the problem of optimal transition domain creation in the non-Manhattan case. This example illustrates that distance to the nearest neighbor to a point does not suffice for construction of the optimal cube.

FIG. 6 is an example illustrating the problem of optimal transition domain creation in the non-Manhattan case. This example illustrates that distance to the nearest neighbor to a point does not suffice for construction of the optimal cube. Finding the optimal transition domain in this case, does not amount to just finding the nearest neighboring conductor, as it does in the Manhattan-only case.

The optimal transition square around point P in this case is defined as the largest square that does not intersect any segment (e.g., a segment representing an edge of a conductor in an IC design) and its edges are aligned to the direction either of AB or CD segments (e.g., segments representing edges of conductors in an IC design). In this case the optimal transition square 502 is the square drawn with dashed edges, which can be generalized to a cube for three-dimensional IC designs using layers, i.e., the optimal transition cube. The optimal transition square 502 is aligned with and touching the segment AB at a single point and not touching (nor intersecting) the segment CD at all. Similarly for the problem in FIG. 8, the optimal transition domain (in this FIG. 6 example, optimum transition square 502) can be generalized to a cube for three-dimensional IC design using layers, i.e., the optimal transition cube. Please note that in constructing the transition cubes there is an important difference between "touching" or "abutting" with zero volume of intersection and "intersecting" with non-zero volume of intersection. Intersection here is always considered between the whole volume of a transition cube and the whole volume of a conductor.

Figure 7:
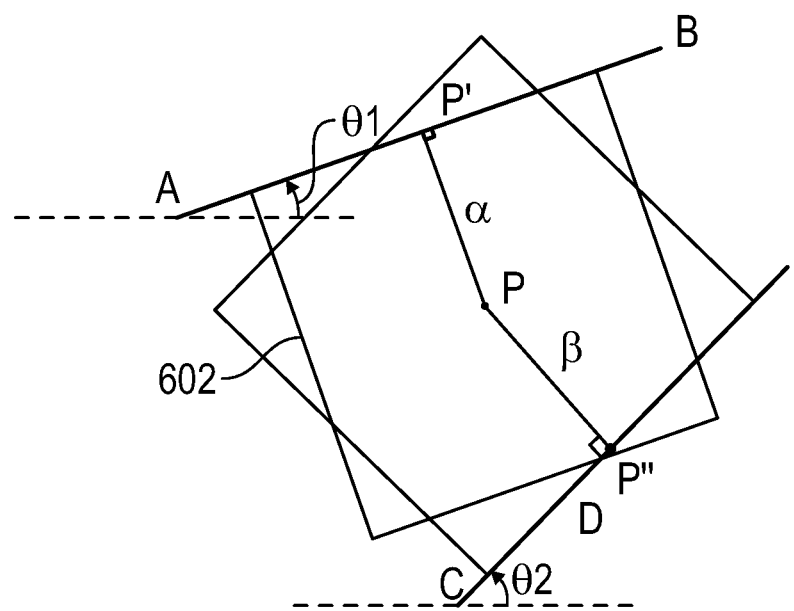
FIG. 7 illustrates another example of optimal transition domain creation in the non-Manhattan case. In this case, the optimal transition cube can be constructed based on the nearest neighbor alone.
Figure 8C:
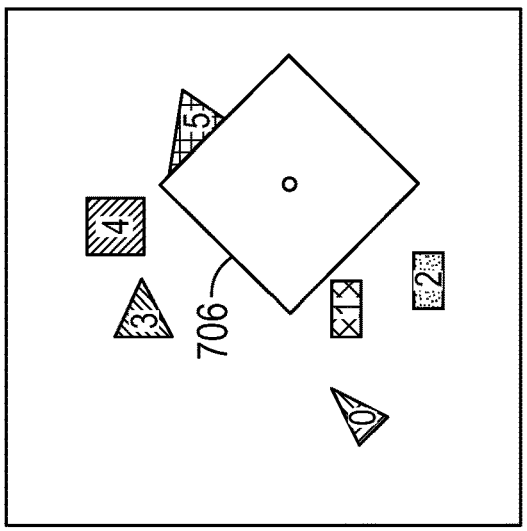
FIGS. 8A-L illustrate examples of optimal transition squares for a new method non-Manhattan multi-obstacle set up.
Figure 8F:
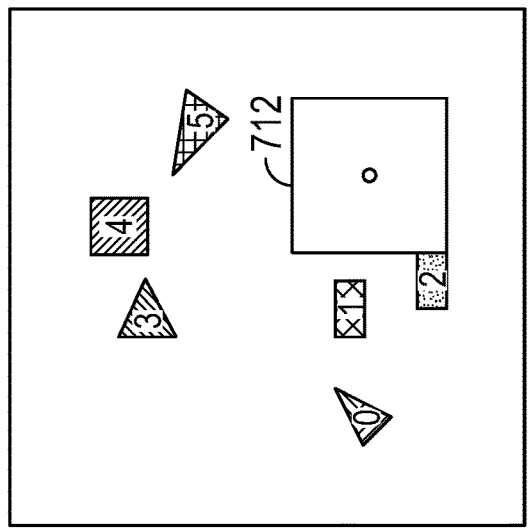
Figure 8B:
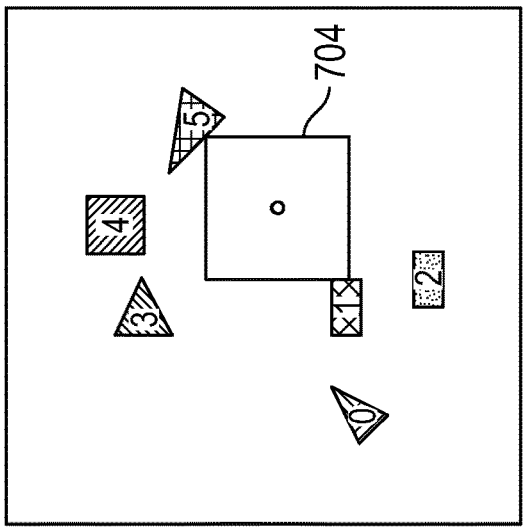
Figure 8E:
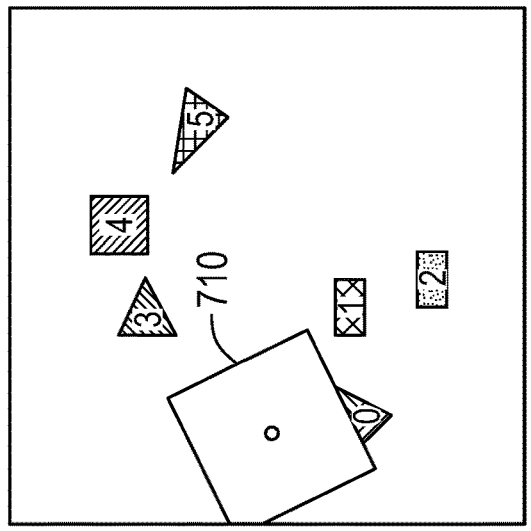
Figure 8A:
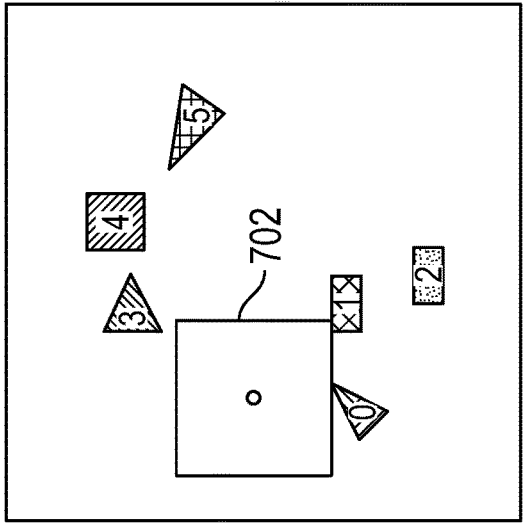
Figure 8D:
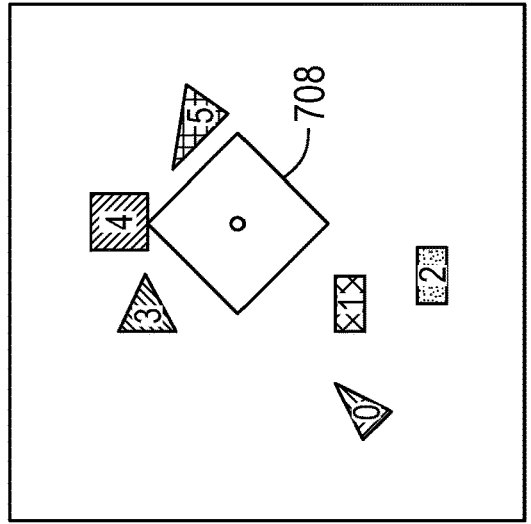
Figure 8G:
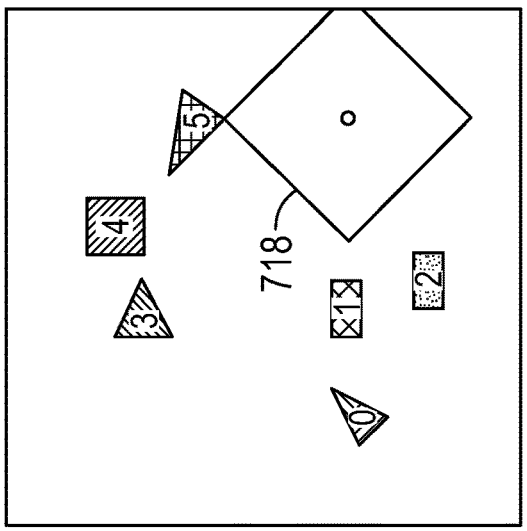
Figure 8J:
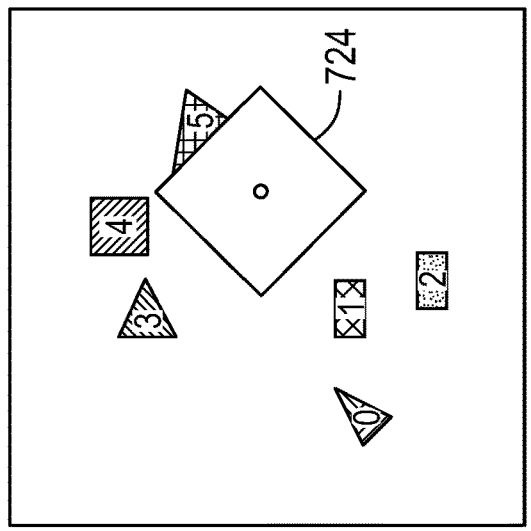
Figure 8H:
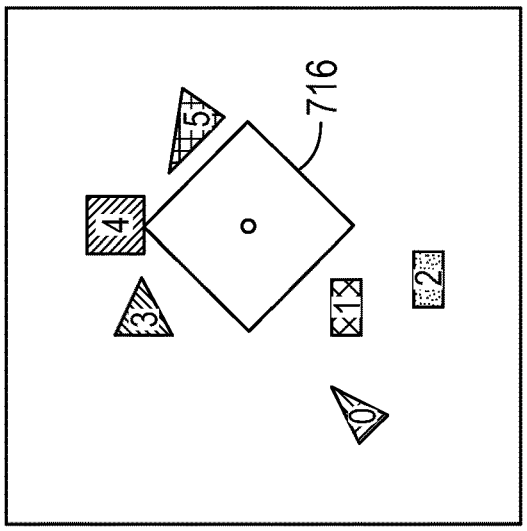
Figure 8K:
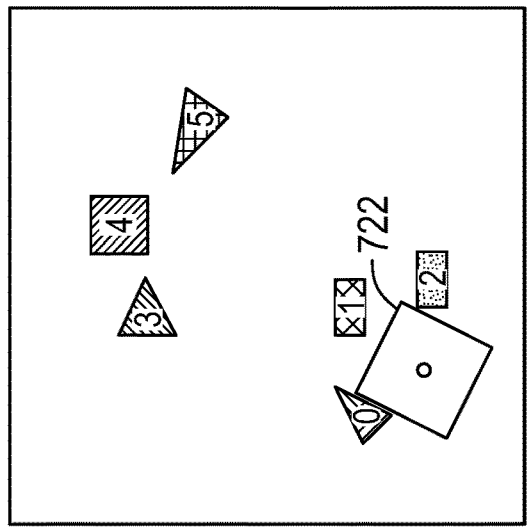
Figure 8I:
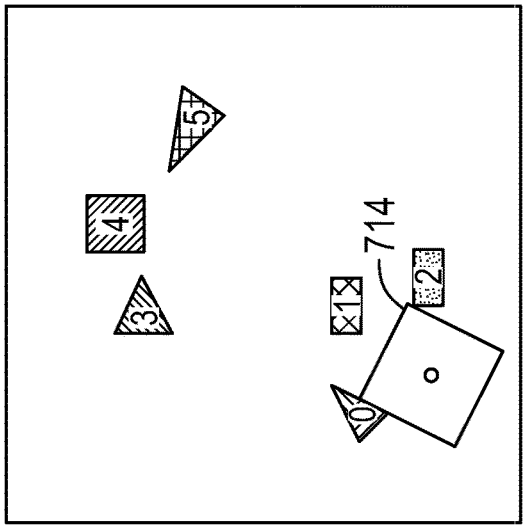
Figure 8L:
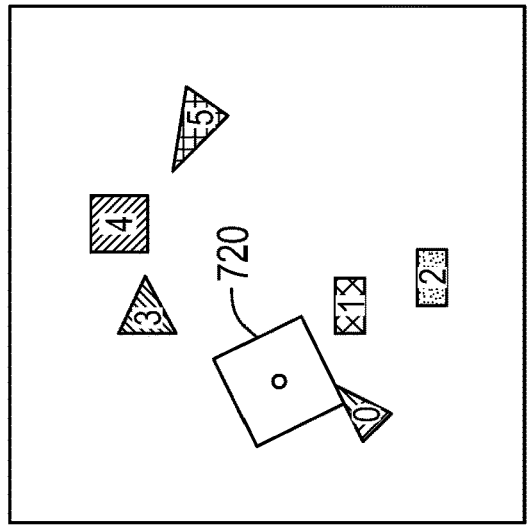

FIG. 7 illustrates another example of an optimal transition domain creation in the non-Manhattan case. In this case, the optimal transition cube can be constructed based on the nearest neighbor alone. In this example, the optimal transition domain 602 is an optimal transition square rotationally and positionally aligned with and touching the segment AB and not touching nor intersecting the segment CD.

Optimal Transition Squares

FIGS. 9A-L illustrate examples of optimal transition squares, using the newly proposed method, for a non-Manhattan multi-obstacle set up. In FIGS. 9A-L, multiple examples of 2D optimal transition domains 702, 704, 706, 708, 710, 712, 714, 716, 718, 720, 722, 724 are illustrated. The obstacles represent conductors in an IC semiconductor design.

Apart from non-optimally creating the optimal transition cubes, prior art solutions face scalability issues. For contemporary complex silicon chips, packages and 3D-ICs spatial index creation times and memory consumption become a bottleneck.

Present embodiments of the invention introduce a radically different approach for solving this problem using a newly defined spatial index structure and a method to properly use it.

Spatial Index

Figure 9:
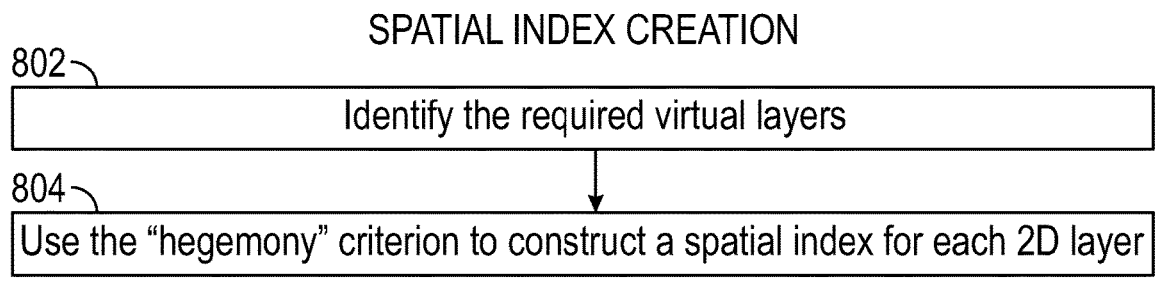
FIG. 9 illustrates an example of the spatial index creation process.

FIG. 9 illustrates an example of the spatial index creation process. For the function of spatial index creation, the method or related system performs the action 802 to "identify the required virtual layers". The method or related system performs the action 804 to "use the 'hegemony' criterion to construct a spatial index reached 2D layer". This is further discussed below with reference to FIGS. 9-15.

One mechanism leading towards a general solution is leveraging the 2.5D nature of the input conductors (e.g., in an IC design) and utilizing multiple 2D spatial indices instead of 3D ones. Specifically, in a design decomposed to N virtual layers instead of creating a single 3D spatial index, a process can instead create N 2D indices. That is, a spatial index is created for each layer of the N layers. However, as seen below, each of these 2D spatial indices will contain fewer conductors, compared to the single 3D index. Please note that here there is a distinction between "layers" and "virtual layers". The process is not creating 3D indexes with entries for conductors of each IC layer but rather a 2D index for each "virtual layer".

Decomposition of 3D Problem to Multiple 2D Problems

Figure 10:
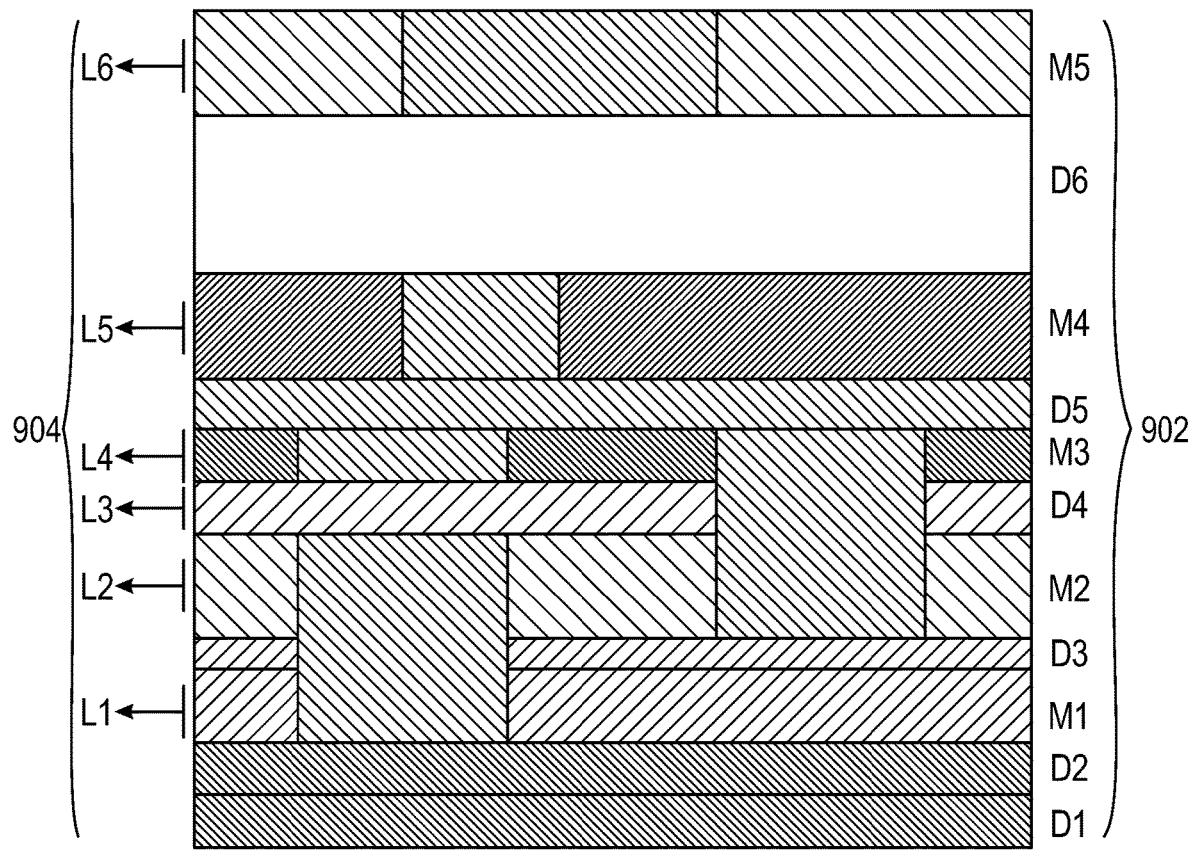
FIG. 10 illustrates decomposition of a 3D problem to multiple 2D ones ("divide"). Cross section. M1-M5 and D1-D5 are the conductor and dielectric layers of the technology stack respectively. The gray rectangles denote actual "drawn" conductors in the input design. Artificial layers L1-L6 capture all the required design information. For each of them, a 2D spatial index is created.

FIG. 9 illustrates decomposition of a 3D problem to multiple 2D ones (to implement the "divide" operation). FIG. 10 presents a cross section view of an IC design, showing design layers 902 on the right (e.g., as used in physical design and manufacture of the IC), and what are termed virtual or artificial layers 904 on the left. M1-M5 and D1-D5 are the conductor and dielectric layers 902 of the technology stack respectively. The gray rectangles denote actual "drawn" conductors in the input design. Artificial layers L1-L6 capture all the required design information for identifying conductors for the spatial index. For each virtual or artificial layer 904, a 2D spatial index is created.

As shown in FIG. 10, the first step is to identify layers 904 for which a 2D spatial index is required. This is done by processing the tech stack and actual conductor heights and thicknesses of the input design. For each identified such layer 904 L(i) a spatial index S(i) is created, able to serve 2D transition cube queries.

Initially, examples focus on the case of purely Manhattan conductors (and consequently purely Manhattan transition cubes). For a query point q(x,y,z), the projected 2D point is q' (x,y). Given q' each index S(i) will return a nearest conductor c(i) and a corresponding minimum distance $d_2(i)$. The system can easily process this information further to calculate the corresponding 3D Loo distances per layer: $d_3(i)=\max(v(q,i), d_2(i))$, where $v(q,i)$ denotes the vertical distance separating q from layer i. The index i for which $d_3(i)$ is minimized, readily gives us the conductor defining the size of the maximal empty cube $c_{sel}$:

$$c_{sel} = \underset{c \in c(i)}{\operatorname{argmin}} d_{3(i)}$$

Optimization Embodiment

A possible optimization here is to omit calculation of the nearest neighbor for distant layers. Each query should be processed progressively from nearest to furthest layers with respect to the z-axis and stop if the so far calculated Loo distance is smaller than the z-axis distance of the next-to-be-processed layer.

This mechanism offers distinct advantages:

Each data structure S(i) indexes only conductors that are present in L(i). Therefore, for layer L(i), the spatial index need only consider a subset of the totality of edge directions, namely those corresponding to conductors of this layer.

2D spatial indices are easier to implement and more choices are available.

Spatial indices for different layers can be created in parallel.

On the other hand, this mechanism as is, cannot efficiently tackle designs containing general non-Manhattan obstacles: If the edges of the nearest conductor at each layer can be arbitrarily oriented, there is no straight-forward way to choose among transition cubes of different layers while still guaranteeing that the cube will be empty of conductors. A more elaborate way is needed in order to support non-Manhattan geometries.

Operation "combine" serves this purpose by providing both a means to process nearest neighbor candidates of a 2D index and combining information from many 2D layer indices while supporting arbitrarily oriented conductors.

This new method progressively composes the optimal transition cube by sequentially processing all candidate obstacles.

Definitions for Processes and Embodiments

Definition 1: For a point q, define the mathematical object $D_q(d, \theta, K)$, where $\theta$ is the direction that defines the coordinate system, d is the Loo distance based on the said system and K is a set of obstacle indices that i) have already been processed by the algorithm and ii) are intersected by the circumscribed circle around a square centered at q with side length d.

It should be clear from the above that at any point the set K does not contain all obstacles visited so far, but only those relevant to the construction of the optimal cube. Description below refers to $D_q$ members using the notation (D.d, D.θ, D.K).

Equality operation between distance objects can be defined.

For each obstacle X and point q, while ignoring all other obstacles, define $$D_{qX} = (d(\theta_{qX}, q, X), \theta_{qX}, [Ix])$$

where Ix is the index of obstacle X and $\theta_{qX}$ is the direction of the closest to q edge of X.

Given a distance object Dq a transition square can be defined:

Definition 2: Square $S_q(d, \theta)$ is a square centered at q with edge length 2*d rotated by angle θ.

For any valid object $D_q$, $S_q(D_q.d, D_q.\theta)$ does not intersect any obstacle in D.K.

In order to define the operation "combine", in some embodiments there is first defined another operation:

Definition 3: Operation trim, given two objects D1 and D2, returns either:
- (D1.d, D1.θ, L) where L contains the merged constraints from D1 and D2 or
- (s, D1.θ, L), where s is the maximal side length of a square centered at q, rotated by D1.θ that does not intersect any obstacle in D2.K and L contains the merged constraints from D1 and D2.

In an embodiment, define combine as a binary operation that merges two $D_q$ objects and returns a new one:

$$\text{combine}::D_q \rightarrow D_q \rightarrow D_q$$

Combine implements the algorithm listed in FIG. 10, in one embodiment.

Combine Example in Pseudocode

FIG. 11 illustrates an example of the "combine" algorithm or operation. The example is shown in pseudocode, which is readily implemented in a programmer's choice of programming languages for execution by a processor, for example as a software or firmware module, or in a further embodiment, implemented in a hardware module.

Operation merge_constraints($D_x$, $D_y$) contains the subset of indices $L \in D_x.K \cup D_y.K$ which correspond to obstacles that are not intersected by the circumscribed circle centered at q with radius $D_x.d$.

Note that in operation combine, the not-trimmed object is always preferred if available, in one embodiment. This promotes transition cubes that have non point-overlaps with obstacle edges.

Also note that binary operation combine is associative and commutative. The order in which the candidate conductors are processed does not alter the result. Also, the identity element can be defined as $D_q(0, 0, \emptyset)$.

Operation combine can be used for all conductors in the candidate list of a cell successively to return an object that defines an optimal transition cube.

More formally, the set of distance objects $D_q$ for a point q equipped with the combine operation and the identity element (unit morphism), define a commutative monoid. Composition can be applied by "folding" $D_q$ objects using combine to create the optimal transition cube.

Finally, operation combine can be generalized to fuse transition squares across spatial indices of 2D layers, by incorporating vertical distances into the calculation. So, combine, provides the means to calculate the optimal transition cubes using the aforementioned multiple 2D-index-based scheme.

Combine Embodiment with Hegemony

Figure 12:
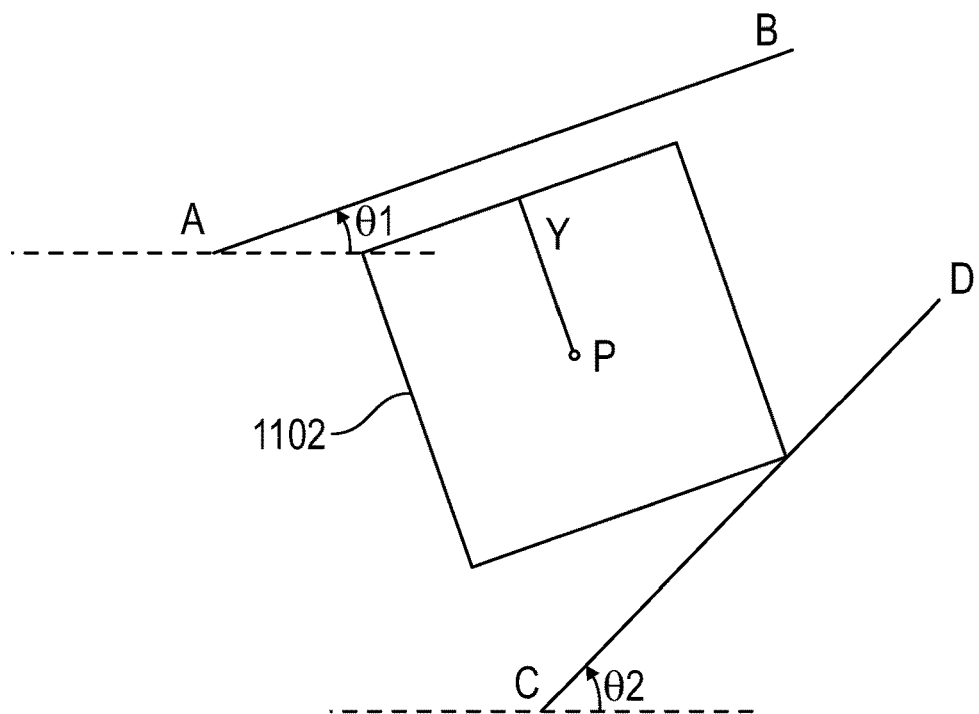
FIG. 12 illustrates a "combine" operation example. γ denotes the half-edge length of the optimal transition square.

FIG. 12 illustrates a "combine" operation example. γ denotes the edge length of the optimal transition square 1102. The optimal transition square 1102 is generalized to an optimal transition cube in various embodiments. As an example, for the problem(s) in FIG. 6 and FIG. 12, the following equations can be written:

$$D_{PAB} \leftarrow (\alpha, \theta_1, \{I_{AB}\})$$
$$D_{PCB} \leftarrow (\beta, \theta_2, \{I_{CD}\})$$
$$D \leftarrow \text{combine}(D_{PAB}, D_{PCD})$$
$$D : (\gamma, \theta_1, \{I_{AB}, I_{CD}\})$$

where γ is the side length of the optimal transition square 1102.

The "hegemony" relation is defined in order to be able to construct 2D spatial indices able to facilitate optimal transition square creation. Such a relation enables efficient spatial indices, by allowing an embodiment to quickly reject polygons that are irrelevant for finding maximal empty cubes. The output of hegemony is a list of conductor unique identifiers stored at each spatial cell of the spatial index, such that during operation of an embodiment only the stored IDs should be checked at any spatial cell in order to construct the optimal transition domain.

Candidate List for Spatial Index Cell

Figure 13:
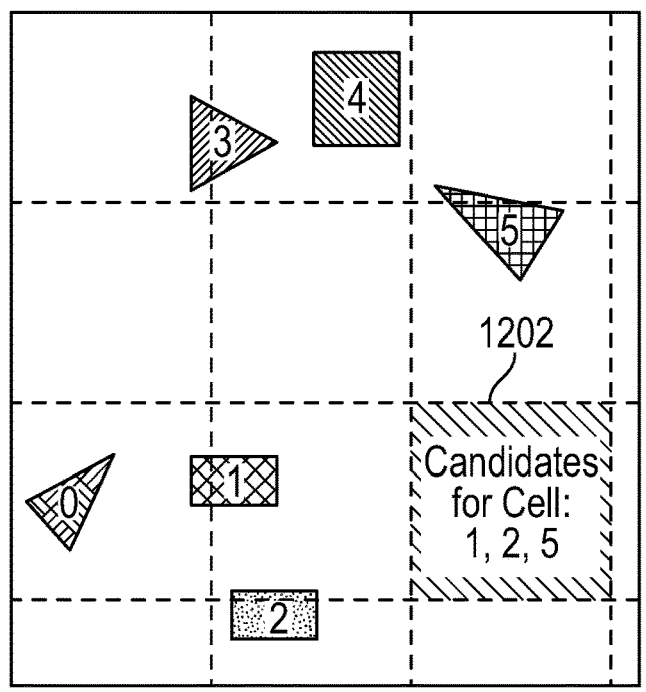
FIG. 13 illustrates an example of a candidate list for a spatial index cell. The highlighted cell contains only three candidates in its candidate list.
Figure 14A:
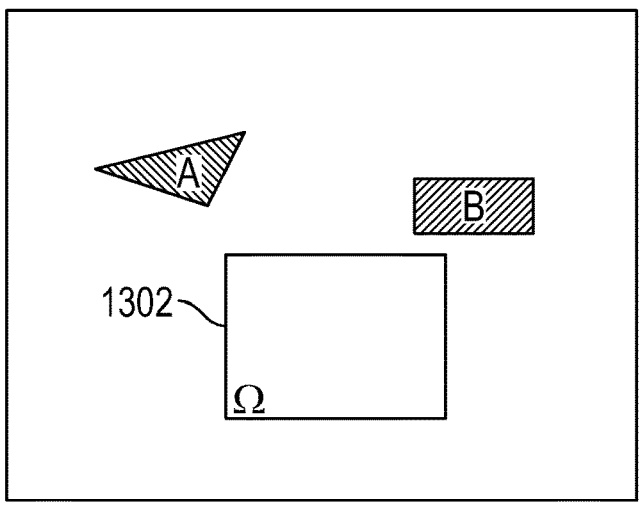
FIGS. 14A-F illustrate "hegemony" tracing across the boundary 052 of a cell 2.
Figure 14B:
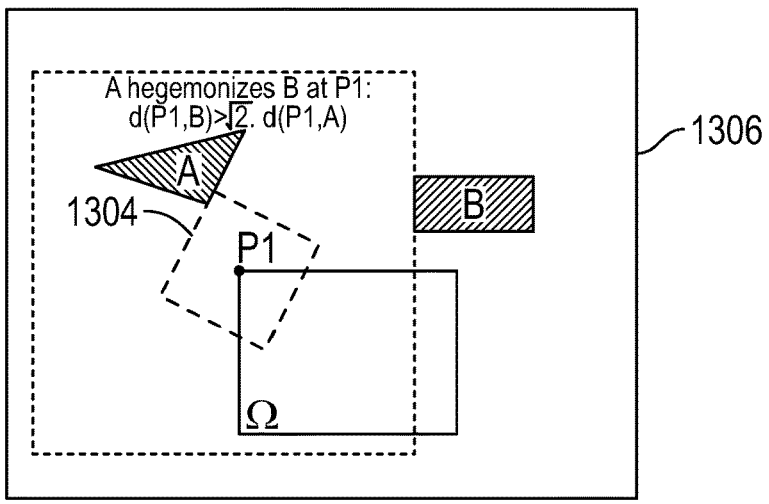
Figure 14C:
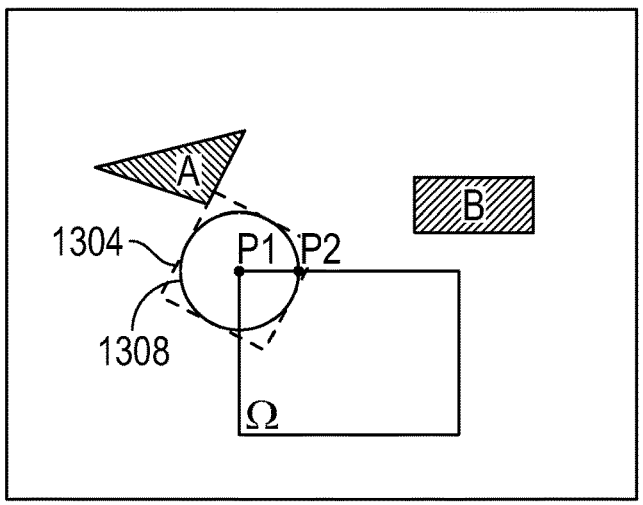
Figure 14D:
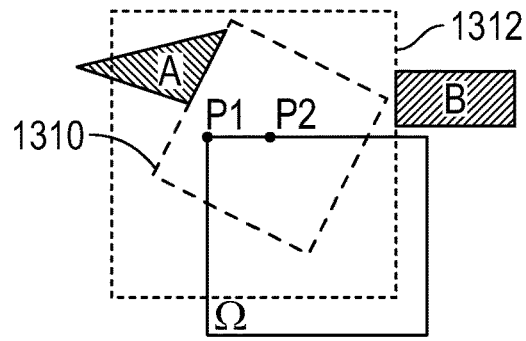
Figure 14E:
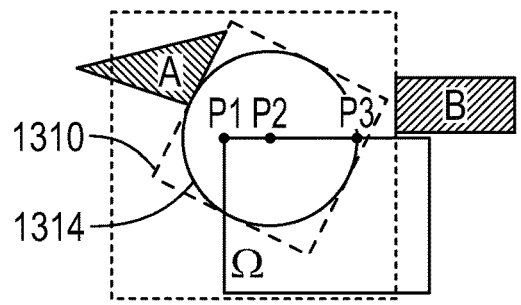
Figure 14F:
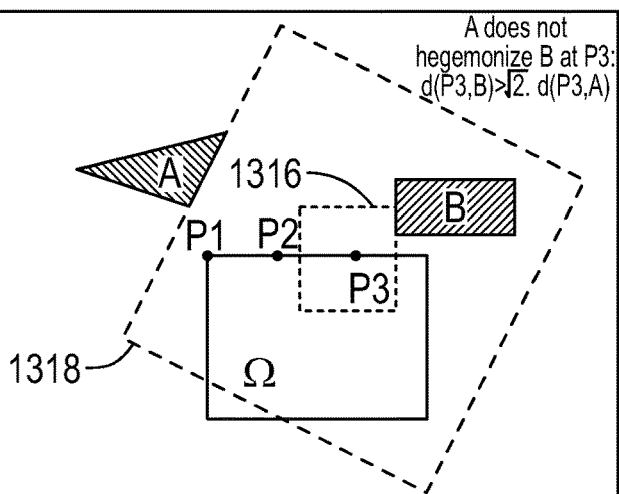

FIG. 13 illustrates an example of a candidate list for a spatial index cell 1202. The highlighted spatial index cell 1202 contains only three candidates in its candidate list. In this example, the spatial index cell is illustrated containing three candidate conductor indices in its candidate list, indicating conductors labeled "1", "2", and "5" are candidate conductors for the spatial index cell 1202, but other numbers of candidate conductor indices could be used in further examples. All other conductors in the design need not to be considered while creating the transition domains for any point inside the area or on the boundary of the highlighted spatial index cell, since the candidate conductors are identified as closest to the spatial index cell 1202. This candidate list selection process has advantages in efficiency in comparison to processes that consider all conductors relative to a specified conductor for each capacitance determination.

Constructing 2D Spatial Indices

The process of constructing all the required 2D spatial indices is described below and further illustrated with reference back to FIG. 9. FIG. 9 describes spatial index creation, including the action 802 "identify the required virtual layers" and the action 804 "use the 'hegemony' criterion to construct a spatial index for each 2D layer".

Consider Q as a 2D rectangular cell. Q could be for example a rectangle comprising one of the cells of a quad-tree, an R-Tree or another spatial index, e.g., a spatial index cell 1202 such as shown in the example in FIG. 13 with an associated candidate list of candidate conductors relative to the spatial index cell 1202. To avoid technical ambiguity in what follows, consider Q to be an open set of $R^2$ and denote its boundary as 8M, both defined as usual in the standard topology of $R^2$.

From here on after, refer to the maximal empty square aligned to an edge of a polygon p as induced by p. The side of the maximal empty square centered at point q and induced by polygon p only is denoted as d(q, p). The expression d(q, p) can be regarded as an Loo distance metric from q to p. Then, define hegemony (generalization of "domination") as:

Definition 4: Obstacle a Hegemonizes B with Respect to Ω iff $\forall q \in \Omega \cup \partial \Omega$, $\sqrt{2}$ d(q, A)<d(q, B).

Hegemony Propositions and Process Embodiments, for use in Constructing Spatial Indexes Intuitively, this is a stricter notion of hegemony compared to the usual one simply comparing distances (i.e., simply d(q, A)<d(q, B)). Hegemony with respect to Ω also signifies that all points $q \in \Omega \cup \partial \Omega$ are nearer to points of the hegemonizing polygon A than to any point of the hegemonized polygon B. But, additionally, this should happen without ambiguity, i.e., the maximal empty square centered at any such q and aligned to an edge of A, in other words induced by A, should not overlap with B, except perhaps on a set of measure zero, even if the square is arbitrarily rotated around its center (hence the $\sqrt{2}$ factor). With a weaker notion of hegemony, e.g., if A was still the nearest neighbor to all $q \in \Omega$, but the circumscribed circle of the maximal empty square induced by A was allowed to overlap with another candidate B, B would be rejected from the candidate lists, although it would still be needed later at query time to construct the maximal empty square. Essentially the combine procedure for square discovery requires such a notion of hegemony to actually be able to construct the maximal empty square.

In order to decide upon hegemony of polygon A vs B with respect to Ω, some embodiments utilize the following proposition:

Proposition: If intersection of obstacle B with Ω is empty, hegemony of obstacle A over B with respect to Q is equivalent to hegemony of obstacle A over B with respect to ∂Ω. Otherwise, A does not hegemonize B.

The truth of this proposition is evident, since any interior point q of Ω will have a larger distance to any point K exterior to Ω than the point on ∂Ω defined by shooting a ray from q towards K. In other words, as far as minimum distances are concerned, it suffices to work with the boundary of the cell. Based on this proposition, to make a decision on hegemony a process need only examine the boundary ∂Ω and not any interior points of Ω.

The problem of making a decision on hegemony is reduced to tracing maximal empty squares induced by two candidate polygons A and B, across the whole boundary ∂Ω, in one embodiment. For example, if maximal empty squares on the whole boundary are induced by polygon A, and the circumscribed circles of these squares do not overlap with B, then A hegemonizes B. Otherwise, A does not hegemonize B.

Tracing the boundary with a constant small step, i.e., sampling at regular intervals could presumably be an option, as would be randomly sampling the boundary. However, besides potential inefficiency, both these approaches do not guarantee correctness, as they may miss crucial points on the boundary. Furthermore, both would require careful tuning of parameter values (e.g., tracing step size, number of random samples etc.).

To devise an efficient algorithm, consider the sphere tracing algorithm of procedural computer graphics. The basic premise is to trace the boundary of the cell ∂Ω at distinct points, chosen such that no crucial information is lost. Suppose that for a point $q_0$ on a cell's edge e, the maximal empty square is induced by A and denoted as $S_{q0}$(d, θ). Assume that $S_{q0}$(d, θ) does not hit B, except perhaps on a set of measure zero. If it does hit B, then immediately A does not hegemonize B. Under these assumptions, the square $S_q$(d, θ) is guaranteed to be empty of polygons.

Then consider the following proposition:

Proposition: To determine hegemony of A over B, tracing along edge e of Ω can safely advance by the half-side of the maximal empty square induced by A.

With this proposition, for any cell Ω a process need only check a number of discrete points on the boundary of the cell to confirm or reject hegemony of A vs B over Ω For each chosen point, the maximal empty square induced by A only is found. If the circumscribed circle of this square overlaps with B, then A does not hegemonize B. If, on the other hand, the circumscribed circle does not overlap with B, the process can choose a new point on the boundary of the cell by advancing a length equal to the half side of the square, always stopping at corners of the cell. If the whole boundary is traversed in this fashion and the circumscribed circles of the maximal empty squares never overlap with B, then A indeed hegemonizes B over Ω.

Hegemony Tracing

FIGS. 14A-F illustrate "hegemony" tracing across the boundary θΩ 1302 of a cell Ω. In FIG. 14, the process of tracing hegemony of A over B with regard to a rectangular cell Q, e.g., a spatial index cell for a spatial index of a specified layer, with A and B as candidate conductors for the spatial index cell, is illustrated. One process embodiment (e.g., in a method, associated system or CAD tool in various embodiments) starts in FIG. 14A by examining the boundary 1302 and identifying point $P_1$ at the upper-left corner of the cell Ω where A hegemonizes B according to the distance relation and squares 1304, 1306 shown in FIG. 14B. Then, draw the inscribed circle 1308 in FIG. 15C in order to define the next point on the boundary and move on to examine point $P_2$ the same way with squares 1310, 1312 in FIG. 15D and inscribed circle 1314 in FIG. 15E until at point $P_3$ the process concludes with squares 1316, 1318 in FIG. 15F that A does not hegemonize B with respect to Ω at $P_3$ because this relation does not hold for point $P_3$ on its boundary 1302 of the cell Ω.

Transition Domain Creation Using 2D Spatial Indices

Figure 15:
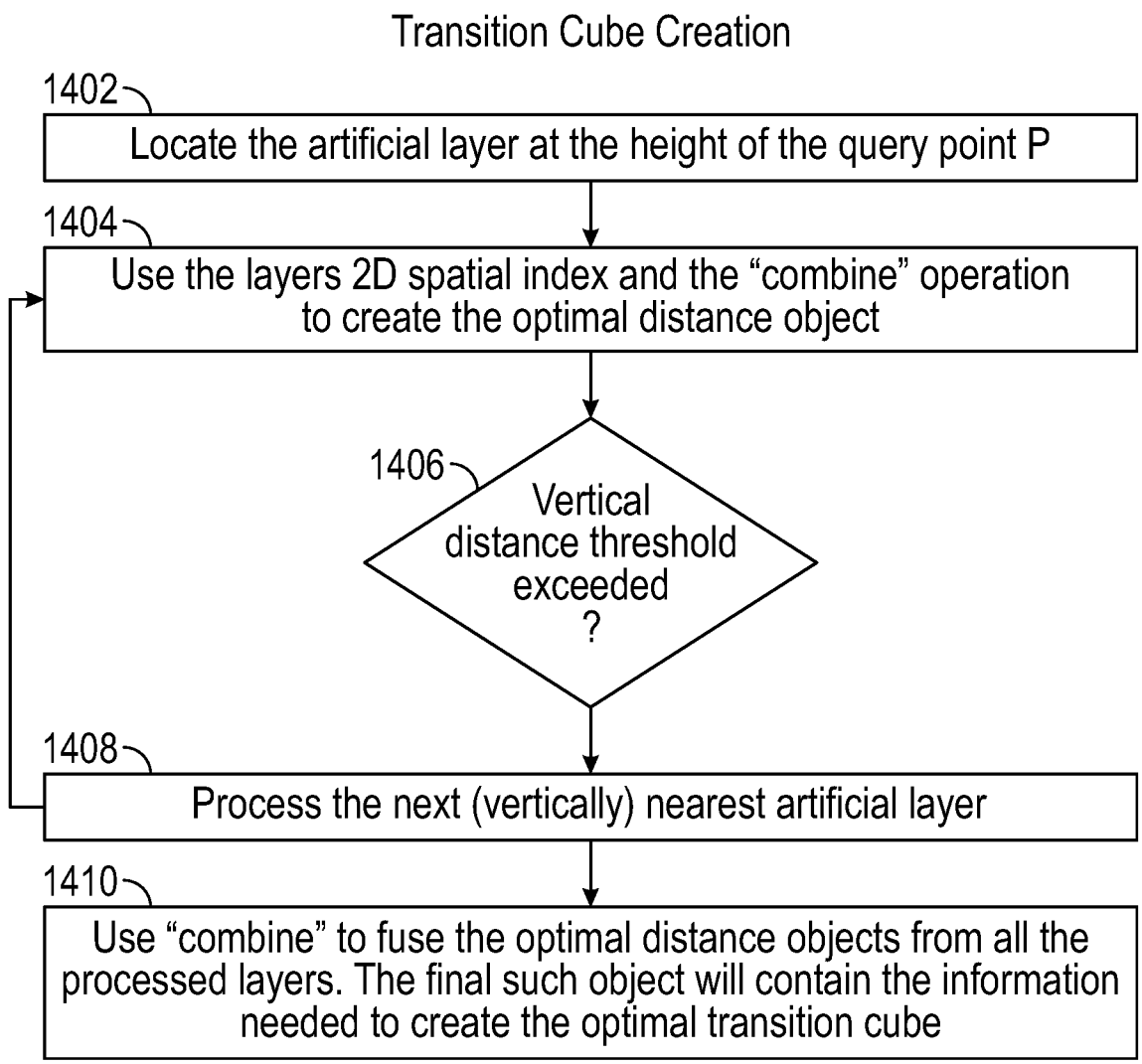
FIG. 15 illustrates an example transition domain creation flowchart, which uses multiple 2D spatial indices.

FIG. 15 illustrates an example transition domain creation flowchart, which uses multiple 2D spatial indices. See also FIG. 9. "Divide" and "hegemony" happen beforehand at spatial index creation time. For example, hegemony is used in various embodiments to determine what the candidate conductors are for each spatial cell. The IDs of these conductors are stored in each spatial cell and only these stored IDs are used at runtime. First the spatial index is created and then, at extraction time, the spatial index is put to use, through the "combine" operation. FIG. 15 illustrates an embodiment of a method for finding the optimal transition domain around any given point P in the free space between the conductors of a silicon chip design based on the three constituting components or operations of various embodiments, "divide", "hegemony", and "combine".

For transition cube creation, one action 1402 is "locate the artificial layer at the height of the query point P". For example, height is herein relative to the height of a layer in a 3D model for an IC.

The next action 1404 is, "use the layers 2D spatial index and the 'combine' operation to create the optimal distance object". For example, the spatial index in the 2D layers model produced by dividing the 3D model into virtual layers (see FIG. 18) is used with "combine" operation on candidate conductors or objects, to determine the optimal empty cube for a 3D query point in the free space between conductors of the design.

The above action 1404 is performed until, as asked in the determination action 1406, the vertical distance threshold is exceeded. If the vertical distance threshold is exceeded, flow proceeds to the action 1410. If the vertical distance threshold is not yet exceeded, flow proceeds to the action 1408.

In the action 1408, "process the next (vertically) nearest artificial layer" and proceed back to the action 1404, to use the layers 2D and the "combine" operation to create the optimal distance object.

In the action 1410, "use 'combine' to fuse the optimal distance objects from all the processed layers. The final such object will contain the information needed to create the optimal transition cube".

Optional Formulations of Transition Cube Creation

Figure 16:
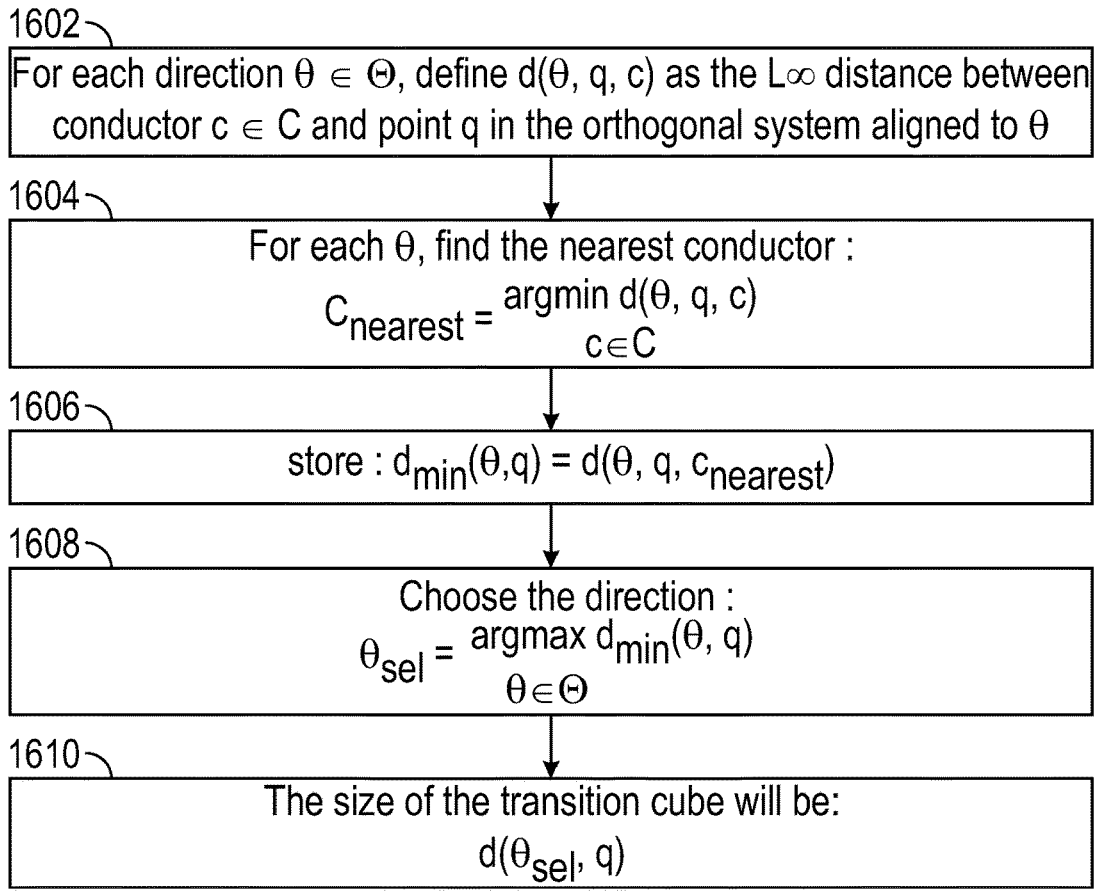
FIG. 16 illustrates an example formulation of a transition cube creation.

FIG. 16 illustrates an example formulation of a transition cube creation. For transition cube creation around point q, $d(\theta, q, c)$ 1602 can be defined as the $L_\infty$ distance between conductor $c \in C$ and point q in the orthogonal coordinate system aligned to $\theta$ for each direction $\theta \in \Theta$. The nearest conductor for each $\theta$ can be identified as 1604

$$c_{nearest} = \underset{c \in C}{\operatorname{argmin}}\, d(\theta, q, c)$$

The $L_\infty$ distance between conductor $c_{nearest}$ and point q can be identified as $d_{min}(\theta, q) = d(\theta, q, c_{nearest})$ 1606. The maximum such $d_{min}$ for $\theta \in \Theta$ can be identified as 1608

$$\theta_{sel} = \underset{\theta \in \Theta}{\operatorname{argmax}}\, d_{min}(\theta, q)$$

The size of the transition cube can be identified as 1610

$$d(\theta_{sel}, q)$$

The formulation can be represented based on one or more hybrid Grid/Octree 3D spatial index data structures or other applicable data structures. A spatial index data structure can be generated for one or more directions (e.g. for each direction) in the input design. The axis-aligned bounding boxes of the design conductors with respect to the corresponding direction of the input design can be represented using the spatial index data structures. The $L_\infty$ distances for all directions can be considered in response to a query point received.

Performance and Limitations of Other Implementation(s)

FIG. 16 illustrates the optimality limitation of the process illustrated in FIG. 15.

Very fast query times.

Spatial index creation time insignificant for most designs, but becomes noticeable for contemporary complex 3D-IC designs.

Memory-demanding for huge designs with many present edge directions.

Suboptimal results for some cases.

The Newly Proposed Method in an Embodiment

Figure 17:
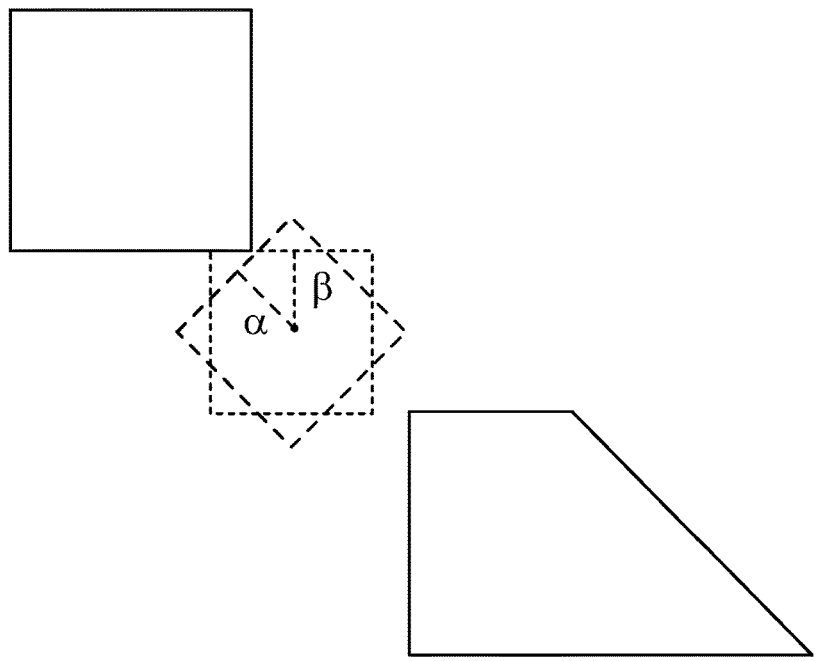
FIG. 17 illustrates performance and limitations of the process illustrated in FIG. 15.
Figure 18:
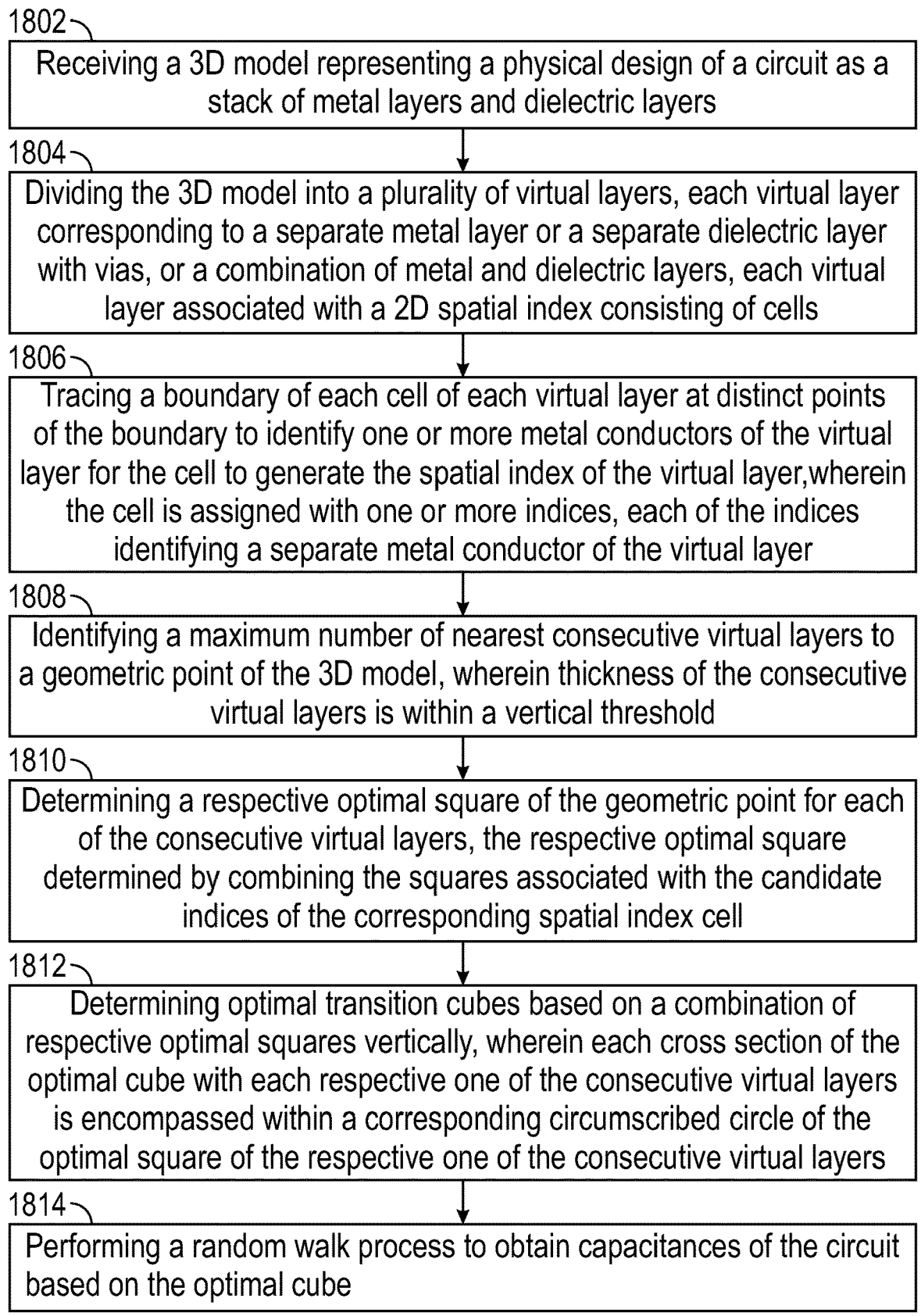
FIG. 18 illustrates a process for obtaining capacitances from a 3D model of a circuit, in accordance with present embodiments.

FIG. 17 illustrates a process for obtaining capacitances from a 3D model of a circuit, in accordance with present embodiments.

One action 1802 is, Receiving a 3D model representing a physical design of a circuit as a stack of metal layers and dielectric layers.

The next action 1804 is, Dividing the 3D model into a plurality of virtual layers, each virtual layer corresponding to a separate metal layer or a separate dielectric layer with vias, or a combination of metal and dielectric layers, each virtual layer associated with a 2D spatial index that has spatial index cells.

The next action 1806 is, Tracing a boundary of each cell of each virtual layer at distinct points of the boundary to identify one or more metal conductors of the virtual layer for the cell to generate the spatial index of the virtual layer, wherein the cell is assigned with one or more indices, each of the indices identifying a separate metal conductor of the virtual layer.

The next action 1808 is, Identifying a maximum number of nearest consecutive virtual layers to a geometric point of the 3D model, wherein thickness of the consecutive virtual layers is within a vertical threshold.

The next action 1810 is, Determining a respective optimal square of the geometric point for each of the consecutive virtual layers, the respective optimal square determined by combining the squares associated with the candidate indices of the corresponding spatial index cell.

The next action 1812 is, Determining optimal transition cubes based on a combination of respective optimal squares vertically, wherein each cross section of the optimal cube with each respective one of the consecutive virtual layers is encompassed within a corresponding circumscribed circle of the optimal square of the respective one of the consecutive virtual layers.

The next action 1814 is, Performing a random walk process to obtain capacitances of the circuit based on the optimal cube.

Divide, Combine and Hegemonize

Figure 19:
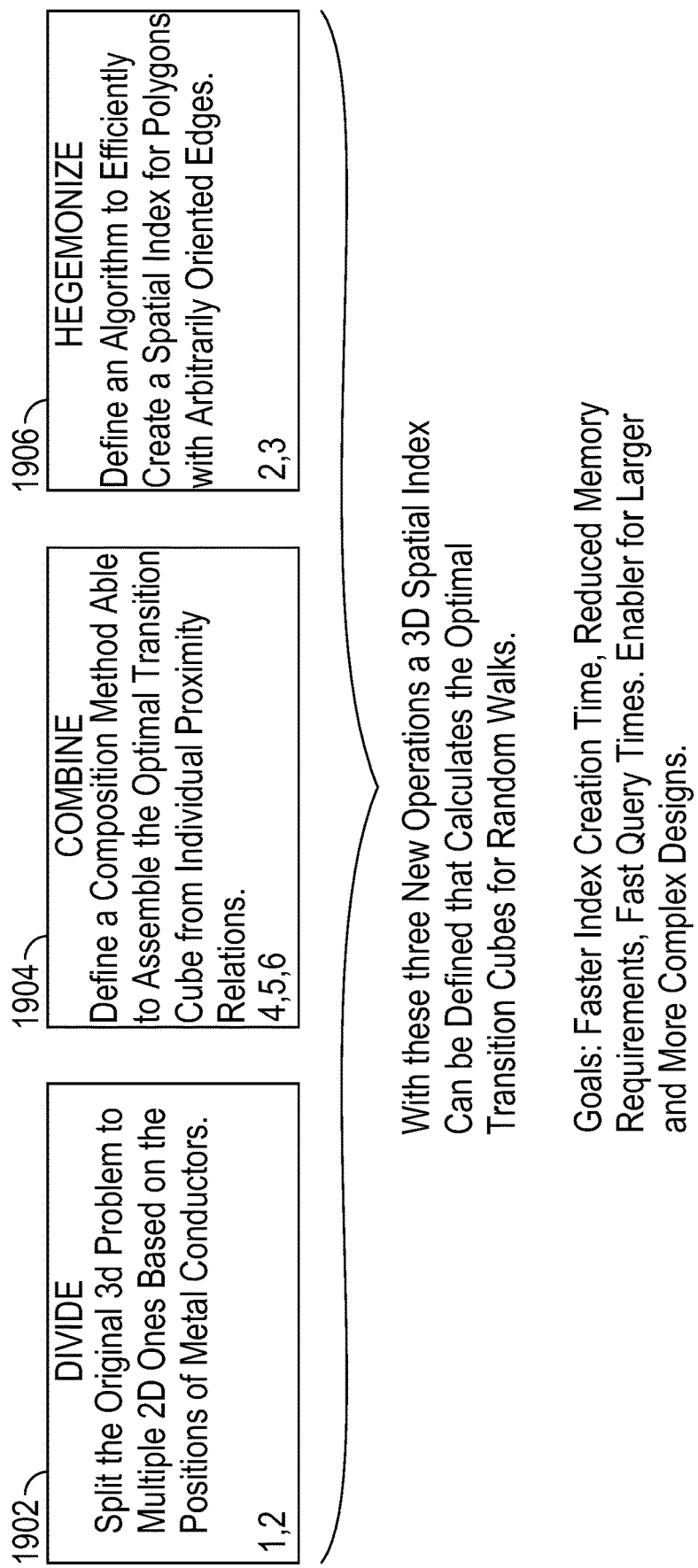
FIG. 19 illustrates divide, combine and hegemonize as components of a process for obtaining capacitances from a 3D model of a circuit, in accordance with present embodiments.

FIG. 19 illustrates divide 1902, combine 1904 and hegemonize 1906 as components of a process for obtaining capacitances from a 3D model of a circuit, in accordance with present embodiments.

Divide 1902 is described as, Split the original 3D problem to multiple 2D ones based on the positions of metal conductors.

Combine 1904 is described as, Define a composition method able to assemble the optimal transition cube from individual proximity relations.

Hegemonize 1906 is described as, Define an algorithm to efficiently create a spatial index for polygons with arbitrarily oriented edges.

In one embodiment, a 3D representation of an integrated circuit design is operated on by the divide 1902 operation, and split into 2D spatial indexes, one for each virtual layer. The hegemonize 1906 operation is applied iteratively at spatial index creation time on each spatial index cell to identify the candidate conductors for the specific cell. The combine 1904 operation works at extraction time to produce optimal transition cubes for any query point in the free space between conductors, considering only the candidate conductors stored in the spatial index. Integration over a surface of an optimal transition cube is used for calculating capacitance.

FIG. 19 further describes, with these three new operations a 3D spatial index can be defined that calculates the optimal transition cubes for random walks. Goals: faster index creation time, reduced memory requirements, fast query times. Enabler for larger and more complex designs.

Spatial index creation is illustrated with reference to FIG. 7, which illustrates an example of the spatial index creation process. Transition cube creation is illustrated with reference back to FIG. 15, which illustrates an example transition domain creation flowchart using multiple 2D spatial indices (also called indexes).

Divide—Decomposition to Multiple 2D Indices

Divide is illustrated with reference back to FIG. 10, which illustrates design layers and artificial or virtual layers for an IC design.

Identify the populated metal layers in the input design.
    Some dielectric layers should also be indexed (due to vias/stacked polygons).
Define the minimal set $\{L_1 \ldots L_n\}$ of (artificial) layers that are needed in order to fully represent the design conductors.
For each layer in $\{L_1 \ldots L_n\}$, create a 2D spatial index $I_i$ able to serve the purpose of optimal transition square creation.
Note that each 2D index $I_i$ contains only the IDs (identifiers) of the conductors present in the corresponding layer $L_i$.
Flexibility on the type of data structures used.
In order to create and use these 2D indices, a new "domination" criterion, termed "hegemony" and a new optimal cube discovery method are described herein in various embodiments.

Hegemony Relation

An embodiment of the hegemony relation is illustrated with reference to FIGS. 12A-F.

Construct a spatial index, where each cell contains the indices of the conductors that are contributing to the specification of the optimal transition cube for any point in of cells area.
Generalizes the "domination" criterion.
The candidates will be processed using the combine operation to create the optimal transition cube.
"Obstacle A hegemonizes B with respect to a rectangular cell $\Omega$ if f $\forall q \in \Omega \cup \partial \Omega$, $\sqrt{2}$ d(q, A)<d(q, B)"
where d (q, A) is the $L_\infty$ distance between point q and polygon A.

"If intersection of obstacle B with $\Omega$ is empty, hegemony of obstacle A over B with respect to $\Omega$ is equivalent to hegemony of A over B with respect to $\partial \Omega$"

Trace maximal empty squares induced by two candidate polygons across the whole boundary.
Guaranteed correctness is required so walking on the boundary with a small step or randomly sampling are prohibiting.
Draw inspiration from the sphere tracing algorithm of procedural computer graphics.
Trace at the boundary at distinct points, chosen such that no crucial information is lost.
"To determine hegemony of A over B, tracing along edge e of $\partial \Omega$ can safely advance by the half side of the maximal empty square induced by A"

The Combine Operation for an Embodiment

Combine is illustrated with reference back to FIG. 12, which illustrates a combine operation example including an optimal transition square (generalizable to an optimal transition cube).

For a query point q, define the (mathematical) object $D_q(d, \theta, K)$, where d is an $L_\infty$ distance based on the coordinate system defined by direction $\theta$ and K the set of obstacle indices that have been processed and are intersected by the circumscribed circle around a square centered at q with side length d.
Define the binary operation:
combine:: $D_q \rightarrow D_q \rightarrow D_q$
combine should be commutative.
Define the identity object $D_q(0, 0, \emptyset)$.
The result object corresponds to the optimal transition square, if only considering the obstacles in its K set.
Combine is illustrated with reference back to FIGS. 8A-L, which illustrate optimal transition squares for a non-Manhattan, multi-obstacle (conductors) case.
$D_q$ along with combine and the identity element form a monoid=>Composition can be applied. This means that a process can consider one conductor at a time to add to the K set and the result will not change.
Successively visit all conductors of the input design. e.g., for 3 conductors: D=combine ($D_3$, combine ($D_2$, $D_1$). Note that $D_i$. K will have just a few obstacle IDs in most cases.
combine can work along objects from different layers after properly modifying the distance attribute to take z-axis distance into account. Specifically:
The optimal transition cubes are calculated from relevant 2D virtual layers with the combine operation.
Note that a minimum number of distances between cubes and conductors needs to be calculated to achieve this.
Combine also seamlessly incorporates information along different planes/2D spatial indices, by suitably augmenting the distance metric to include the z axis.

Optimizations for Embodiments

Various optimizations are applicable (e.g., auxiliary index to speedup overlap checks, pruning based on the bounding-box, etc.)
Aspects of technological solutions
Decompose the original 3D problem to multiple 2D layers.
Use the new "hegemony" criterion to create a spatial index for each layer.
Use the "combine" operation to both process candidate lists at each layer and fuse results from different layers.
Vastly reduced memory requirements and much faster index creation time regardless of the number of edge directions in the input design.
Always optimal transition cubes.

CAD System Embodiment

Figure 20:
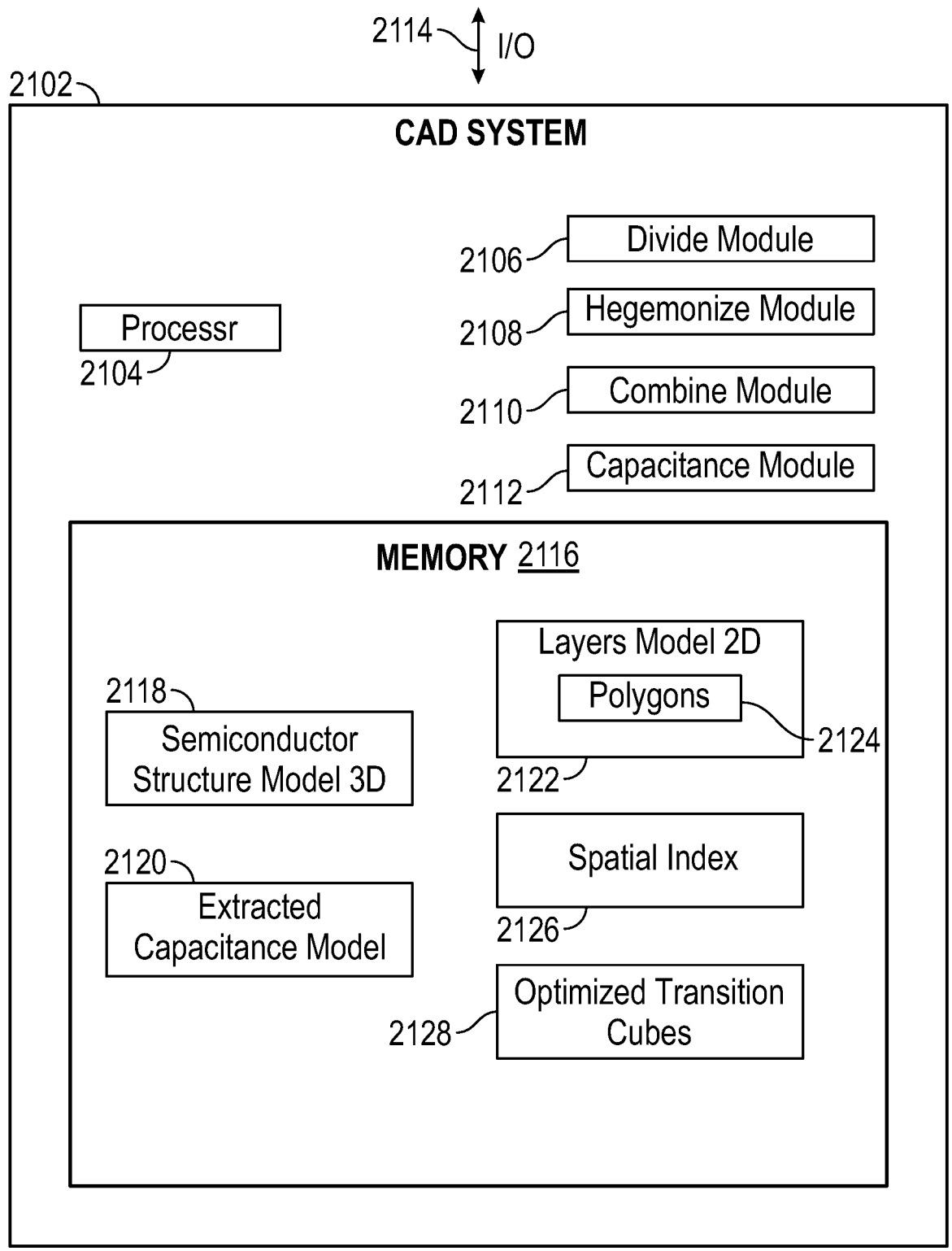
FIG. 20 illustrates a CAD system that produces extracted capacitances from a semiconductor structure model, in accordance with present embodiments.

FIG. 20 illustrates a CAD system 2102 that produces extracted capacitances from a semiconductor structure model, in accordance with present embodiments. In the CAD system 2102, a processor 2104 is coupled to memory 2116, a divide module 2106, a hegemonize module 2108, a combine module 2110, and a capacitance module 2112. These and further modules are readily implemented in software executing on a processor 2104, firmware, hardware, or combinations thereof in various embodiments. The memory 2116 holds a semiconductor structure model 2118 (in 3D, i.e., a 3D layers model) that represents an IC design, a layers model 2122 (in 2D, i.e. a 2D layers model) that includes polygons 2124 representing conductors of the IC design, a spatial index 2126, and an extracted capacitance model 2120. These models are readily implemented in various data structures as appropriate to CAD systems for IC designs. Processing can be implemented with single processor, multiprocessing, distributed processing, virtual processing on physical hardware, etc.

In an example operating scenario, the CAD system 2102 receives the semiconductor structure model 2118 into the memory 2116, and operates on the semiconductor structure model 2118 to produce the extracted capacitance model 2120, also in memory 2116. The divide module 2106 operates on the semiconductor structure model 2118 to produce the layers model 2122. The hegemonize module 2108 and the combine module 2110 operate on the layers model 2122 to produce the spatial index 2126 (e.g., one spatial index per 2D layer) and optimized transition cubes 2128 (e.g., for spatial index cells). The capacitance module 1212 operates on the optimized transition cubes 2128 to produce the extracted capacitance model 2120 (e.g., capacitance between conductors). Operation of the various modules 2106, 2108, 2110, 2112 is according to various embodiments of methods, algorithms, processes, actions, etc. described above with reference to FIGS. 1A-19.

Method Embodiment

Figure 21:
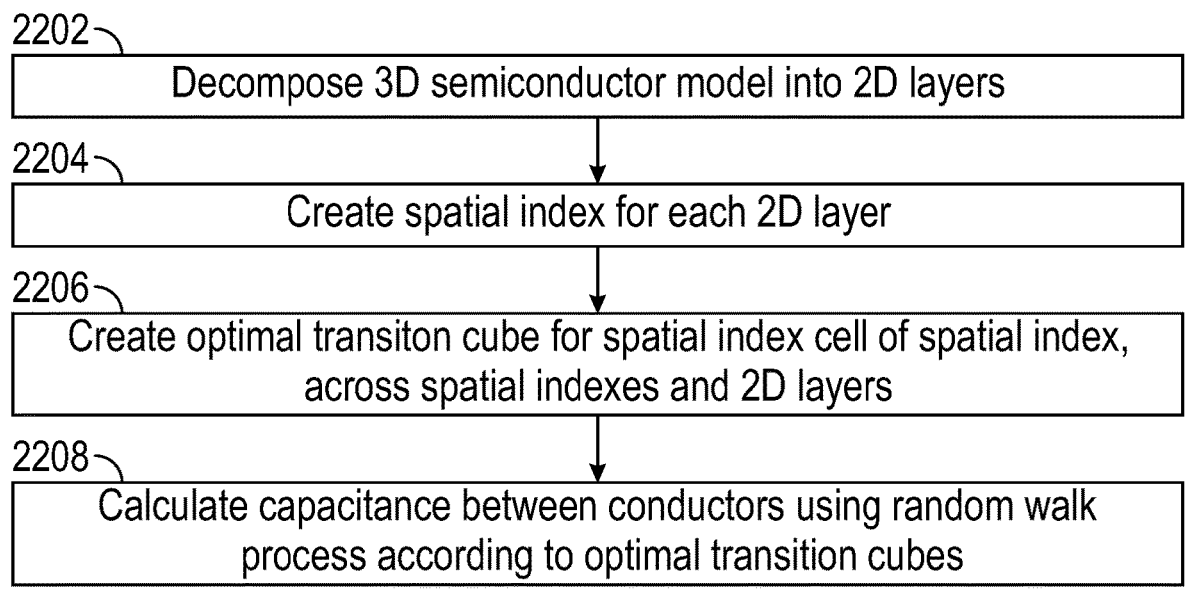
FIG. 21 illustrates a method for capacitance extraction, which can be machine-implemented as a CAD method in accordance with present embodiments.

FIG. 21 illustrates a method for capacitance extraction, which can be machine-implemented as a CAD method in accordance with present embodiments. More specifically, the method can be implemented in software executing on a processor, firmware, hardware, or combination thereof. The method can be implemented in tangible, non-transient computer-readable media that has instructions for execution by a processor. The method can be implemented in a CAD system (see FIG. 20) or a CAD tool.

In an action 2202, the system decomposes a 3D semiconductor model into virtual layers. In various embodiments, each virtual layer has two-dimensional polygons corresponding to conductors in the semiconductor structure model. In various embodiments, two-dimensional polygons can include models of rounded geometry, e.g., curves. In various embodiments, the two-dimensional polygons in the two-dimensional layers include non-Manhattan-only geometries, i.e., are not restricted to Manhattan-only arrangement and shape.

In an action 2204, the system creates spatial indexes for virtual layers. Each spatial index stores candidate conductor(s) for spatial index cells of the virtual layer. That is, a spatial index cell could store one or more candidate conductors. In various embodiments, the spatial index identifies nearest neighbor candidate polygons for the spatial index cells of a corresponding virtual layer. In various embodiments, each spatial index, corresponding to one of the virtual layers, is a single, unified spatial index for all angles relative to the query points. In various embodiments, creating the spatial index uses a hegemony relation relative to conductors and spatial index cells to identify and store candidate conductors as nearest neighbor candidate polygons for a spatial index cell for insertion as obstacles into the spatial index cell.

In an action 2206, the system creates optional transition cubes for query points, considering candidate conductors stored in spatial indexes. Each optimal transition cube is based on a largest size transition square that does not intersect a conductor volume. Such creation of optimal transition cubes for spatial index cells is performed across spatial indexes and virtual layers. In various embodiments, each spatial index, for a corresponding two-dimensional layer, has many spatial index cells (e.g., an XY grid of spatial index cells), and an optimal transition cube is created for each spatial index cell. In various embodiments, creating the optimal transition cube is done by fusing optimal distance objects based on the nearest neighbor candidate polygons of a spatial index cell of the spatial index of the two-dimensional layer, incorporating vertical distances corresponding to the three-dimensional semiconductor structure model. In various embodiments, each optimal transition cube includes a maximal cubic transition domain empty of conductors.

In an action 2208, the system calculates capacitance between conductors using integration over surfaces of optimal transition cubes. In various embodiments, calculating the capacitance between the conductors is done by using Monte Carlo integration and Green's function on surfaces of the optimal transition cubes.

ADDITIONAL CONSIDERATIONS

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A machine-implemented computer aided design (CAD) method for capacitance extraction, comprising:
   decomposing a semiconductor structure model representing a three-dimensional circuit, into a plurality of virtual layers each having a plurality of polygons corresponding to conductors in the semiconductor structure model, the semiconductor structure model including a geometric point;
   creating a plurality of spatial indexes respectively for the plurality of virtual layers, each spatial index indicating respectively for each spatial index cell of a corresponding virtual layer at least one candidate conductor of the corresponding virtual layer;
   creating optimal transition squares for the geometric point respectively for one or more consecutive virtual layers according to spatial indexes of the one or more consecutive virtual layers, wherein the geometric point is located in one of the one or more consecutive virtual layers, the optimal transition squares constrained by one or more candidate conductors of the one or more consecutive virtual layers;

creating an optimal transition cube for the geometric point considering the one or more candidate conductors based on the optimal transition squares; and calculating capacitance of the three-dimensional circuit using surfaces of the optimal transition cube.

2. The machine-implemented CAD method for capacitance extraction of claim 1, wherein each of the plurality of virtual layers includes a 2D (two dimensional) area divided into a plurality of spatial index cells, wherein the plurality of virtual layers are stacked along a third dimension, and wherein the optimal transition squares for the geometric point for the virtual layers correspond to optimal transition squares for extended points to 2D areas of the virtual layers from the geometric point along the third dimension.

3. The machine-implemented CAD method for capacitance extraction of claim 2, wherein the optimal transition squares comprise a particular optimal transition square for an extended point in a particular spatial index cell in one of the one or more consecutive virtual layers according to a particular spatial index, wherein the particular spatial index indicates a plurality of candidate conductors, and wherein the creation of the optimal transition squares comprises:

determining that a particular one of the plurality of candidate conductors does not constrain the particular optimal transition square, and wherein the particular one candidate conductor is excluded from the one or more candidate conductors.

4. The machine-implemented CAD method for capacitance extraction of claim 3, wherein the particular optimal transition square is constrained by a minimal set of conductors in the one of the one or more consecutive virtual layers, and the one or more candidate conductors comprise the minimal set of conductors.

5. The machine-implemented CAD method for capacitance extraction of claim 1, wherein a hegemony relationship is absent in the at least one candidate conductor indicated.

6. The machine-implemented CAD method for capacitance extraction of claim 1, wherein at least one of the polygons comprises a model of a rounded geometry or non-Manhattan-only geometries.

7. The machine-implemented CAD method for capacitance extraction of claim 1, wherein each optimal transition cube is empty of conductors and abuts at least one conductor.

8. The machine-implemented CAD method of claim 7, wherein the creating the optimal transition cube comprises a random walk through successive transition domains terminating in the optimal transition cube.

9. The machine-implemented CAD method of claim 7, wherein the creating the optimal transition cube comprises a random walk through transition domains, in which a number of hops for nearest neighbor queries leading to walk termination is minimized.

10. The machine-implemented CAD method of claim 7, wherein the creating the optimal transition cube comprises a random walk through transition domains, including a next transition domain that is rotated relative to a preceding transition domain.

11. The machine-implemented CAD method of claim 7, wherein the creating the optimal transition cube comprises a random walk through transition domains, the random walk having walk termination at the optimal transition cube, with the optimal transition cube rotationally and positionally aligned with a segment of a conductor and touching a segment of a differing conductor.

12. The machine-implemented CAD method of claim 7, wherein the creating the optimal transition cube comprises a random walk through transition domains, the random walk having walk termination at the optimal transition cube, with the optimal transition cube rotationally and positionally aligned with, and touching, a segment of a conductor.

13. A tangible, non-transitory, computer-readable media having instructions thereupon which, when executed by a processor, cause the processor to perform a method comprising:

decomposing a semiconductor structure model representing a three-dimensional circuit, into a plurality of virtual layers each having a plurality of polygons corresponding to conductors in the semiconductor structure model, the semiconductor structure model including a geometric point;

creating a plurality of spatial indexes respectively for the plurality of virtual layers, each spatial index indicating respectively for each spatial index cell of a corresponding virtual layer at least one candidate conductor of the corresponding virtual layer;

creating optimal transition squares for the geometric point respectively for one or more consecutive virtual layers according to spatial indexes of the one or more consecutive virtual layers, wherein the geometric point is located in one of the one or more consecutive virtual layers, the optimal transition squares constrained by one or more candidate conductors of the one or more consecutive virtual layers;

creating an optimal transition cube for the geometric point considering the one or more candidate conductors based on the optimal transition squares; and calculating capacitance of the three-dimensional circuit using surfaces of the optimal transition cube.

14. The computer-readable media of claim 13, wherein each of the plurality of virtual layers includes a 2D (two dimensional) area divided into a plurality of spatial index cells, wherein the plurality of virtual layers are stacked along a third dimension, and wherein the optimal transition squares for the geometric point for the virtual layers correspond to optimal transition squares for extended points to 2D areas of the virtual layers from the geometric point along the third dimension.

15. The computer-readable media of claim 14, wherein the optimal transition squares comprise a particular optimal transition square for an extended point in a particular spatial index cell in one of the one or more consecutive virtual layers according to a particular spatial index, wherein the particular spatial index indicates a plurality of candidate conductors, and wherein the creation of the optimal transition squares comprises:

determining that a particular one of the plurality of candidate conductors does not constrain the particular optimal transition square, and wherein the particular one candidate conductor is excluded from the one or more candidate conductors.

16. The computer-readable media of claim 15, wherein the particular optimal transition square is constrained by a minimal set of conductors in the one of the one or more consecutive virtual layers, and the one or more candidate conductors comprise the minimal set of conductors.

17. A computer aided design (CAD) system, comprising:
a memory; and
a processor, to perform a method comprising:
decomposing a semiconductor structure model representing a three-dimensional circuit, into a plurality of virtual layers each having a plurality of polygons corresponding to conductors in the semiconductor structure model, the semiconductor structure model including a geometric point;

creating a plurality of spatial indexes respectively for the plurality of virtual layers, each spatial index indicating respectively for each spatial index cell of a corresponding virtual layer at least one candidate conductor of the corresponding virtual layer;

creating optimal transition squares for the geometric point respectively for one or more consecutive virtual layers according to spatial indexes of the one or more consecutive virtual layers, wherein the geometric point is located in one of the one or more consecutive virtual layers, the optimal transition squares constrained by one or more candidate conductors of the one or more consecutive virtual layers;

creating an optimal transition cube for the geometric point considering the one or more candidate conductors based on the optimal transition squares; and calculating capacitance of the three-dimensional circuit using surfaces of the optimal transition cube.

18. The CAD system of claim 17, wherein the creating the optimal transition cube comprises a random walk through transition domains, including a next transition domain that is rotated relative to a preceding transition domain.

19. The CAD system of claim 17, wherein the creating the optimal transition cube comprises a random walk through transition domains, the random walk having walk termination at the optimal transition cube, with the optimal transition cube rotationally and positionally aligned with a segment of a conductor and touching a segment of a differing conductor.

20. The CAD system of claim 17, wherein the creating the optimal transition cube comprises a random walk through transition domains, the random walk having walk termination at the optimal transition cube, with the optimal transition cube rotationally and positionally aligned with, and touching, a segment of a conductor.

* * * * *